(12) United States Patent
Paradiso et al.

(10) Patent No.: US 9,674,929 B2
(45) Date of Patent: Jun. 6, 2017

(54) METHODS AND APPARATUS FOR ILLUMINATION CONTROL

(71) Applicants:Joseph Paradiso, Arlington, MA (US); Matthew Aldrich, Boca Raton, FL (US); Nan Zhao, Cambridge, MA (US)

(72) Inventors: Joseph Paradiso, Arlington, MA (US); Matthew Aldrich, Boca Raton, FL (US); Nan Zhao, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 162 days.

(21) Appl. No.: 14/642,754

(22) Filed: Mar. 10, 2015

(65) Prior Publication Data

US 2015/0257238 A1    Sep. 10, 2015

Related U.S. Application Data

(60) Provisional application No. 61/950,622, filed on Mar. 10, 2014.

(51) Int. Cl.
*H05B 37/02* (2006.01)

(52) U.S. Cl.
CPC ..... *H05B 37/0272* (2013.01); *H05B 37/0227* (2013.01); *H05B 37/0245* (2013.01)

(58) Field of Classification Search
CPC .... H05B 37/00; H05B 37/02; H05B 37/0227; H05B 37/0245
USPC ........................................ 315/291, 307, 312
See application file for complete search history.

(56) References Cited

U.S. PATENT DOCUMENTS

| 7,167,176 | B2 | 1/2007 | Sloan et al. |
| 7,471,051 | B1 * | 12/2008 | Wacknov ........... H05B 37/0254 315/291 |
| 2011/0169979 | A1 | 7/2011 | Hong |

(Continued)

FOREIGN PATENT DOCUMENTS

WO    2012140152 A1    10/2012

OTHER PUBLICATIONS

Aldrich, M., et al., 2010, Energy efficient control of polychromatic solid state lighting using a sensor network. Proc. SPIE, vol. 7784, Tenth International Conference on Solid State Lighting, p. 778408 (Aug. 18, 2010).

(Continued)

*Primary Examiner* — Tung X Le
(74) *Attorney, Agent, or Firm* — Stephen R. Otis

(57) ABSTRACT

In exemplary embodiments of this invention, one or more I/O devices accept input from a human user. The input is indicative of a value for each control variable in a set of separate control variables. A computer analyzes the input and outputs control signals to specify a set of separate setpoints. Dimmers adjust the intensity or color of a set of luminaires according to the setpoints. The number of separate control variables is much less than the number of separate setpoints. Having a human control a small number of control variables, in order to control a much larger number of separate luminaire setpoints of luminaires, has at least two advantages: control is faster and control is more intuitive. In illustrative implementations, the luminaire setpoints that are being controlled are not functions of each other.

17 Claims, 15 Drawing Sheets

(56) References Cited

U.S. PATENT DOCUMENTS

| | | | |
|---|---|---|---|
| 2011/0254453 A1* | 10/2011 | Veskovic | E06B 9/32 |
| | | | 315/152 |
| 2012/0091915 A1* | 4/2012 | Ilyes | H05B 37/0263 |
| | | | 315/307 |
| 2012/0265350 A1 | 10/2012 | Ashdown | |
| 2014/0139135 A1 | 5/2014 | Saito et al. | |
| 2014/0177469 A1* | 6/2014 | Neyhart | H04L 12/2807 |
| | | | 370/254 |

OTHER PUBLICATIONS

Houser, K., et al., 2003, Measuring the subjective response to interior lighting: paired comparisons and semantic differential scaling. Lighting Research and Technology Sep. 2003 vol. 35, No. 3, pp. 183-195.

Jacob, R., et al., 1994, Integrality and separability of input devices. ACM Transactions on Computer-Human Interaction (TOCHI), vol. 1 Issue 1, Mar. 1994, pp. 3-26.

Flynn, J., et al., 1973, Interim Study of Procedures for Investigating the Effect of Light on Impression and Behavior. Journal of the Illuminating Engineering Society, vol. 3, Issue 1, p. 87, 1973.

Sandwell, D., 1987, Biharmonic spline interpolation of GEOS-3 and SEASAT altimeter data. Geophysical Research Letters, vol. 14, No. 2, pp. 139-142, Feb. 1987, American Geophysical Union.

\* cited by examiner

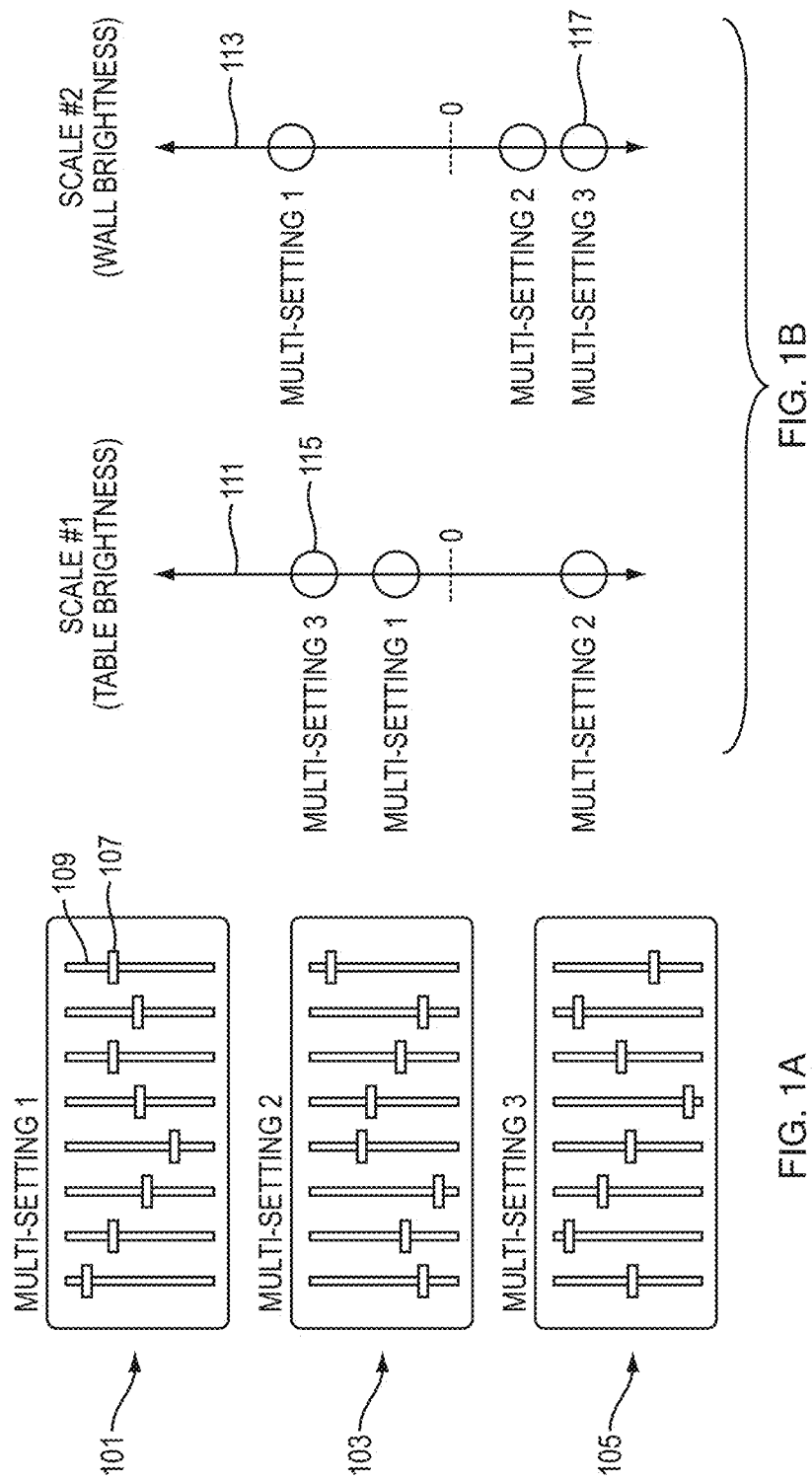

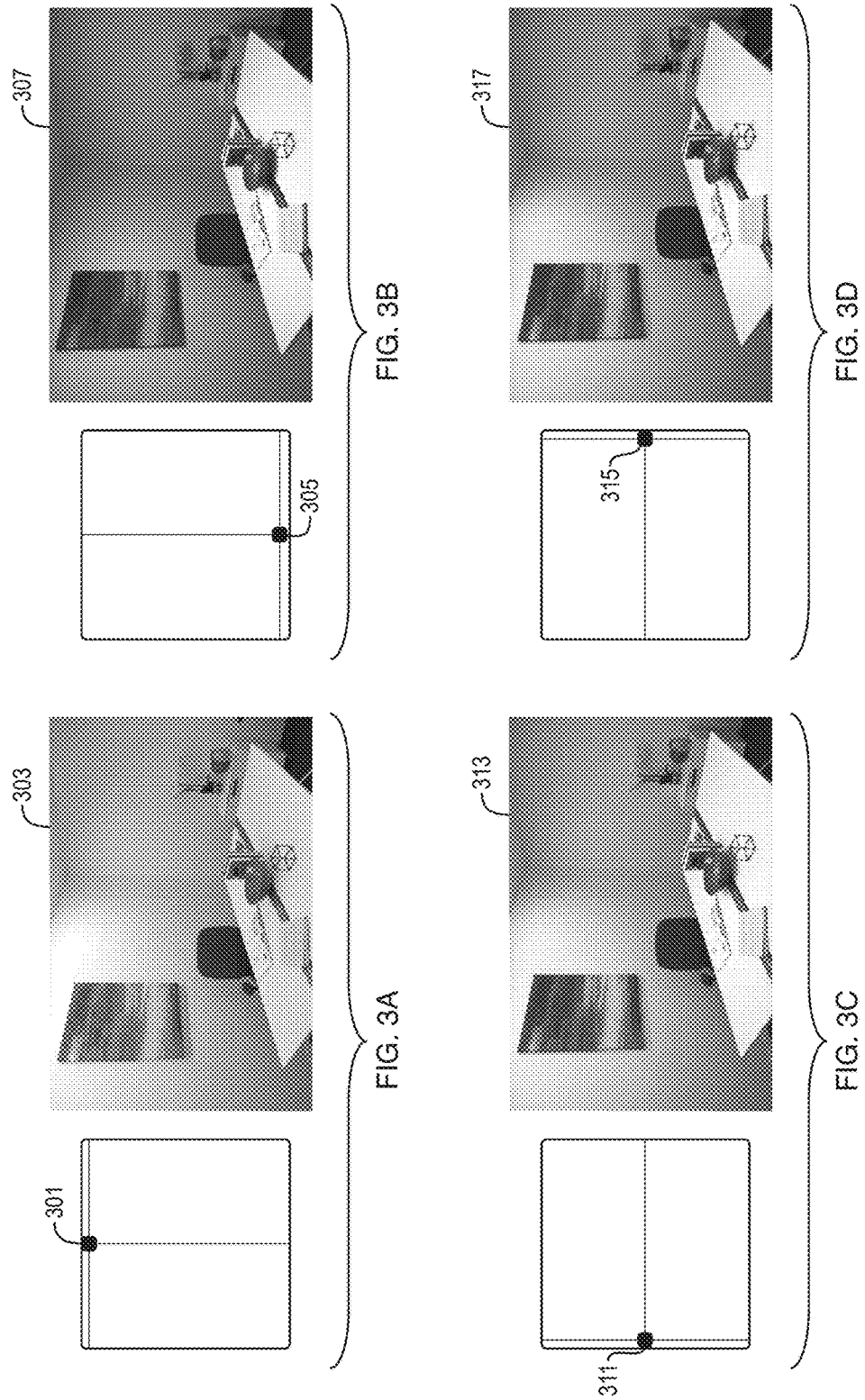

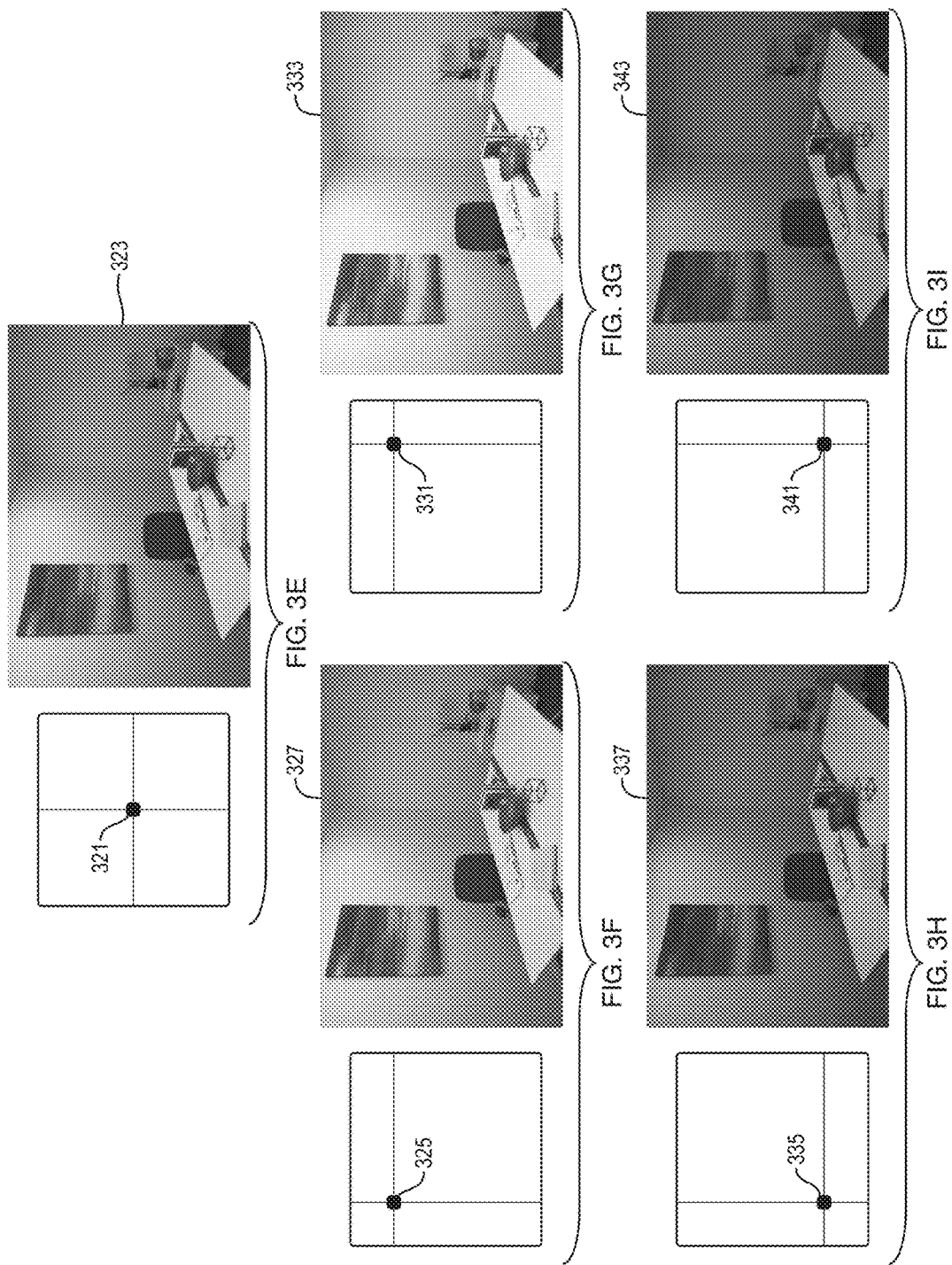

METHODS AND APPARATUS FOR ILLUMINATION CONTROL

RELATED APPLICATIONS

This application is a non-provisional of, and claims the benefit of the filing date of, U.S. Provisional Patent Application No. 61/950,622, filed Mar. 10, 2014, the entire disclosure of which is herein incorporated by reference.

FIELD OF THE TECHNOLOGY

The present invention relates generally to illumination control.

SUMMARY

In exemplary implementations of this invention, one or more I/O devices accept input from a human user. The input indicates a value for each control variable in a set of separate control variables. A computer analyzes the input and outputs control signals to specify a set of separate setpoints. Dimmers adjust the intensity or color of a set of luminaires according to the setpoints. The number of separate control variables is much less than the number of separate setpoints of luminaires.

In illustrative implementations, a human provides input in a lower dimensional control space, in order to control a higher dimensional group of illumination settings. The settings control physical luminaires (e.g., a lamp, or a ceiling light, or a wall light).

Having a human control a small number of control variables, in order to control a much larger number of separate luminaire setpoints of luminaires, has at least two advantages. First, control is faster. A human can more quickly adjust a small number of control variables (e.g., two control variables), than adjust many different separate setpoints (such as intensity or color of a much larger number of luminaires). Second, control is more intuitive. Without being limited by theory, a reason why the control is more intuitive is that, in some implementations of this invention: (a) axes or other attributes of the control variables are derived from a set of data regarding human perceptions or sensor readings of lighting effects under different combinations of luminaire setpoints; and (b) the control variables are designed to best explain, or capture the maximum variation in, the data set.

In illustrative implementations, the luminaire setpoints that are being controlled are not functions of each other.

In illustrative implementations, one or more I/O devices record linear or angular displacement indicated by a selection made by a human user. The linear or angular displacement indicates a value of at least one control variable.

In some use scenarios of this invention, a human selects a x,y point on a touch screen of a handheld control device. The x,y coordinates of the selected physical point of the touch screen correspond to a point in a two-dimensional control space. The coordinates of the point are the values of two control variables. For example, in some use scenarios, there are two control variables, table brightness and wall brightness, and the x, y coordinates of the selected physical point on the touch screen correspond to values of the two control variables.

A computer maps each single point in the control space to a single point in the higher dimensional illumination space.

For example, if a control space $\Omega$ has n dimensions, then the n coordinates of each point in the control space represent values of n separate control variables. A computer maps the n-dimensional point in the control space $\Omega$ to a m-dimensional point in an illumination space $\Gamma$. The control space $\Omega$ has less dimensions than the illumination space $\Gamma$; that is, m>n. The m coordinates of each point in the illumination space $\Gamma$ represent values of m separate illumination variables. For example, in some cases, each of the m separate illumination variables controls either (A) achromatic intensity of an individual luminaire, or (B) color of multiple luminaires.

For example, in some cases in which a touch screen is used, each discrete x,y position on the touch screen of a handheld control device maps to a unique luminaire multi-setting.

As used herein, a "multi-setting" means a permutation of values of separate illumination variables, where each illumination variable controls an attribute of illumination produced by one or more luminaires. Here is an example of a "multi-setting". In this example: (a) there are four separate illumination variables for three luminaires; (b) the first illumination variable determines achromatic intensity of the first luminaire, and has 256 discrete possible values (0, 1, 2, . . . 255); (c) the second illumination variable determines achromatic intensity of the second luminaire, and has 256 discrete possible values (0, 1, 2, . . . 255); (d) the third illumination variable determines achromatic intensity of the third luminaire, and has 256 discrete possible values (0, 1, 2, . . . 255); (e) the fourth illumination variable determines the color of light emitted by all three luminaires and has 4 discrete values (1, 2, 3, 4); (f) an example of a "multi-setting" of the luminaires would be the following permutation of values of the illumination variables: first illumination variable=178, second illumination variable=212, third illumination variable=33, fourth illumination variable=2; and (g) another example of a "multi-setting" of the luminaires would be the following permutation of values of the illumination variables: first illumination variable=114, second illumination variable=41, third illumination variable=244, fourth illumination variable=1. In this example, each point in the control space maps to a single luminaire multi-setting, and thus to values of four separate illumination variables.

In illustrative implementations, moving from a first point to a second point in a lower dimensional control space corresponds to moving from a first point (first luminaire multi-setting) to a second point (second luminaire multi-setting) in the higher dimensional illumination space, thus changing multiple illumination setpoints. For example, in some cases: (a) each luminaire multi-setting is a permutation of values of nine separate illumination variables; and (b) moving from a first point to a second point in the control space (and thus from a first luminaire multi-setting to a second luminaire multi-setting in the illumination space) separately changes nine different illumination setpoints. Or for example, in some cases: (a) there are four luminaires and five separate illumination variables; and (b) a user selection of a point in the control space may map to instructions to increase the luminance of a first luminaire by a first amount, to increase the luminance of a second luminaire by a different amount, to decrease the luminance of a third luminaire to decrease by a third amount, to decrease the luminance of a fourth luminaire by a fourth amount, and to change the color of all four luminaires.

Each of the illumination states in the illumination space is separately controlled. For example, in some use scenarios, the illumination states consist of intensity of multiple luminaires, and a single displacement from a first point to a second point in the control space causes the intensity of each of the multiple luminaries to change (increase or decrease) by a different amount.

Here are more examples of implementations of this invention, in which a control device accepts human input regarding n dimensions of a control space $\Omega$, the n dimensions of the control space map to m dimensions of an illumination space $\Gamma$, and illumination space $\Gamma$ is a higher-dimension space than the control space. For example: (a) in some cases, n=2 and the two dimensions of the control space $\Omega$ are table brightness and wall brightness; (b) in some cases, n=2 and the two dimensions of the control space $\Omega$ are intensity (overall brightness of the room) and appearance (overhead/wallwash illumination); and (c) in some cases, m=9 and the nine dimensions of the illumination space $\Gamma$ are nine separate illumination variables representing the achromatic intensity of 8 different luminaires and the color of all 8 luminaires; and (d) in some cases, m=24 and the 24 dimensions of the illumination space $\Gamma$ are intensity settings of the red, blue and green channels of 8 different luminaires.

In many implementations: (a) each luminaire itself has multiple color channels (e.g., three channels for red, blue and green, respectively); and (b) each luminaire multi-setting effectively specifies intensity of each color channel of each luminaire. Here are some examples: In some cases: (a) a nine-dimensional multi-setting is a permutation of values of nine separate illumination variables, where the first eight illumination variables specify the achromatic (achromatic) intensity of eight luminaires, respectively, and the ninth setpoint specifies the color of all eight luminaires; and (b) thus the ninth setpoint specifies the relative intensities of the three color channels of each luminaire, in order to determine the overall color emitted by each luminaire. In some other cases, a 24 dimensional multi-setting represents a permutation of values of 24 separate illumination variables, where the 24 illumination variables represent intensity of red, blue and green channels for each of eight luminaires.

In some cases, the control device includes a graphical user interface, and a human selects a position on the GUI. The x, y coordinates of the selected position on the GUI corresponds to two coordinates in the control space. If the control space is three dimensional, then a third dimension is represented by a third input. For example, in some cases, the magnitude of pressure exerted on a touch screen by a human is a third input, which corresponds to a third coordinate in the control space.

In some cases, an input for a coordinate of the control space is binary. For example, in some cases, an I/O device (such as a button or GUI) accepts an input that is binary (such as a press on the button or selection on the GUI), and third input represents a third coordinate in a control space.

Alternatively, the control device includes a set of one or more linear sliders, such that each linear slider represents a different coordinate in the control space. In these cases, position along the physical axis of one of the sliders represents a value of of one of the control variables. For example, in some cases, two control variables are represented by two linear sliders, such that position of the first slider along the physical axis of the first slider represents a value of the first control variable, and position of the second slider along the physical axis of the second slider represents a value of the second control variable. Or, in some cases: (a) there is only one control variable represented by one linear slider; or (b) there are three control variables represented by three linear sliders.

Alternatively, in some cases, the control device includes a set of one or more rotatable I/O devices (such as a dial), such that angular displacement of each of the rotatable I/O devices represents a value of one of the control variables.

In illustrative implementations, a computer calculates a data matrix that represents a set of data regarding observations (e.g., human perceptions or sensor measurements) of one or more lighting effects of different luminaire multi-settings. For example, in some cases, the set of data regarding observations comprises (a) data regarding human subjective reactions to illumination under different luminaire multi-settings; (b) sensor readings of incident light under different luminaire multi-settings, or (c) a combination of the two.

In illustrative implementations, a computer performs a dimension-reducing algorithm, which takes the data matrix as an input and which outputs a lower-dimensional approximation of the data matrix.

The dimensionality-reducing algorithm causes data to be lost. Thus, the dimensionality-reducing algorithm performs a lossy compression of the data matrix. The number of dimensions of the approximation is less than the number of dimensions of the data matrix.

In some cases, the dimensionality-reducing algorithm comprises a multidimensional scaling (MDS) algorithm, a principal components analysis (PCA) algorithm, an unsupervised learning algorithm, a cluster analysis algorithm, a self-organizing map algorithm, a matrix factorization algorithm, a factor analysis algorithm, an independent components analysis algorithm, a principal surfaces algorithm, a principal curves algorithm, a principal manifolds algorithm, a nonlinear dimensionality reduction (NLDR) algorithm, a manifold learning algorithm, an autoencoder algorithm, a probabilistic non-linear PCA algorithm, a Gaussian latent variable model algorithm, a curvilinear component analysis algorithm, a curvilinear distance analysis (CDA) algorithm, a diffeomorphic dimensionality reduction algorithm, a kernel PCA algorithm, an isomap algorithm, a locally-linear embedding (LLE) algorithm, a manifold alignment algorithm, a diffusion map algorithm, a Hessian LLE algorithm (HLLE), a modified LLE (MLLE) algorithm, a local tangent space alignment algorithm, a local MDS algorithm, a maximum variance unfolding (MVU) algorithm, a semidefinite embedding algorithm, a nonlinear PCA algorithm, a data-driven high-dimensional scaling (DD-HDS) algorithm, a manifold sculpting algorithm, a RankVisu algorithm, a topologically constrained isometric embedding (TCIE) algorithm, or a rational perspective map MDS algorithm, or metric MDS algorithm.

In illustrative implementations: (a) the data matrix is defined in a first vector subspace; (b) the lower-dimensional approximation is defined in a second vector subspace; and (c) the number of dimensions of the first vector subspace is greater than the number of dimensions of the second vector subspace.

In some cases: (a) a computer performs a PCA (principal components analysis) algorithm that takes as an input a data matrix that represents observation values; (b) the data matrix has a column-wise empirical mean (i.e., the sample mean of each column has been shifted to zero); (c) the PCA algorithm involves calculating a set of vectors of principal component scores, and (d) the set of vectors of principal component scores are orthogonal to each other.

For example, in some cases, a computer performs a PCA algorithm that computes a two-dimensional approximation of the data matrix, where the first principal component corresponds to wall brightness and the second principal component corresponds to table brightness. In this example, wall brightness and table brightness are the two control variables, and are two axes (dimensions) of a mathematical space in which the approximation is defined.

Or, for example, in some cases, a computer performs a PCA algorithm to compute a control model in a two-dimensional control space, where the first principal component corresponds to intensity (overall brightness of the room) and the second principal component to appearance (overhead/wallwash illumination). In this example, intensity and appearance are the two control variables, and are two axes (dimensions) of a mathematical space in which the approximation is defined.

In illustrative implementations, the approximation of the data matrix is itself a matrix.

In some cases, a computer calculates control variables derived from human input as follows: A computer outputs signals that cause a set of luminaires to illuminate a room according to different luminaire multi-settings. One or more I/O devices record a set of data indicative of human perceptions of the lighting effects of the different luminaire multi-settings. A computer calculates a high-dimensional data matrix (e.g., a mean-centered and normalized data matrix) that represents this set of data. A computer performs a dimensionality-reducing algorithm (e.g., an MDS or PCA algorithm) that takes the data matrix as input and that calculates a lower-dimensional approximation of the data matrix. The approximation is itself a matrix. The control variables are vectors (e.g., principal components or principal axes) in this matrix.

For example, in some cases, each of the human subjective reactions comprise input regarding a user's perception of the degree of similarity between a pair of scenes (i.e., a perception of how similar the scenes are). That is, the input indicates the perceived "distance" between two scenes. Each scene in the pair is the same room illuminated under a different luminaire multi-setting. A computer calculates a high-dimensional data matrix that represents this input regarding similarity. A computer performs a MDS (multi-dimensional scaling) algorithm that takes the data matrix as an input and that computes a lower dimensional approximation of the data matrix. In some cases, the MDS algorithm involves taking a symmetric matrix of "distance" data (e.g., a measure of how far two scenes are from each other) and calculating a basis in lower number of dimensions where the estimated interpoint distances are as close as possible to the original set of distances. For example, in some cases, the MDS algorithm involves finding a set of coordinates (given a user-specified number of dimensions) according to the average distance between all points obtained from the users. Either an individual user or group of users provides input in the form of a series of paired comparisons which rate the similarity of pairs of lighting scenes (presented either simultaneously or sequentially). The scaling procedure of the MDS algorithm performs an ordination of the data, e.g., based on the distance (or degree of dissimilarity) between the pairs of lighting scene. In some cases, the human input is gathered from a group of users and the computer performs an INDSCAL version of the MDS algorithm.

Alternatively, in some cases, each of the human subjective reactions comprises a selection of an attribute that describes the user's perception of a scene. Each scene is the same room illuminated under a different luminaire multi-setting. A human user selects multiple adjectives to describe each scene. For example, in some cases, each user selects 29 adjectives to describe each scene. Each of the adjectives is selected from a pair of antonyms, such as (a) "pleasant" or "unpleasant", (b) "like" or "dislike", (c) "spacious" or "cramped", or (d) "sociable" or "unsociable". The input of the user(s) (in the form of the selected attributes) is recorded by one or more I/O devices. A computer takes this input and calculates a data matrix that represents the perceived attributes of the different scenes. A computer performs a dimension-reducing algorithm that takes the data matrix as an input and that computes a lower-dimensional approximation of the data matrix. For example, in some cases, this dimension-reducing algorithm comprises a PCA (principal components analysis) algorithm, a SVD (singular value decomposition) algorithm, a LDA (linear discriminant analysis) algorithm, eigenvector-based multivariate analysis algorithm, or factor analysis algorithm. In the case of the PCA algorithm, each of the dimensions of the control space is a principal component, and the principal components are orthogonal to each other.

In some cases, a computer calculates control variables derived from sensor readings of incident light as follows: For example, in some cases, one or more light sensors gather illuminance and spectral data for each of set of different scenes. Each different scene is the same room illuminated under a different luminaire multi-settings. For example, in a prototype of this invention, for each scene, for six areas in the room (ceiling, table and four walls), light sensors gather 13 different spectral readings (at 25 m nm increments from 400 nm to 700 n nm) and measure illuminance at the four corners and center of the area. This is repeated for 8 separate scenes. The computer calculates a 96×18 data matrix representing these sensor readings. A computer performs a dimensionality-reducing algorithm that takes this data matrix representing the sensor readings of incident light as input, and that calculates a lower-dimension approximation of the data matrix. The approximation is itself a matrix. The control variables are vectors (e.g., principal components or principal axes) in this matrix. For example, in some cases, this dimension-reducing algorithm comprises a PCA (principal components analysis) algorithm, a SVD (singular value decomposition) algorithm, a LDA (linear discriminant analysis) algorithm, or other eigenvector-based multivariate analysis algorithm, or factor analysis algorithm.

In some implementations of this invention: (a) the control variables are synthetic variables derived from a rank p matrix; (b) p is greater than n, where n is the number of dimensions of the control space $\Omega$; and (c) the rank p matrix includes data that is indicative of human perceptions of lighting effects under different multi-settings of the luminaires.

In some implementations of this invention: (a) the axes of the control variables are determined by calculating the eigenvalues and eigenvectors of a scatter matrix and calculating a set of coefficients to weight each eigenvector according to a cost function (e.g., principal component analysis); and (b) n<<p, where n is the number of control variables in the control space $\Omega$ and p is the rank of the scatter matrix. In some implementations, the scatter matrix includes data indicative of human perceptions of lighting effects under different multi-settings of the luminaires. In some implementations, the scatter matrix includes data indicative of sensor measurements of lighting effects under different multi-settings of the luminaires.

In some implementations: (a) the axes of the control variables are determined by calculating the eigenvalues and eigenvectors of a distance matrix and calculating a scatter matrix according to a cost function (e.g., multiple dimensional scaling); and (b) n<<p, where n is the number of control variables in the control space $\Omega$ and p is the rank of the distance matrix. In some implementations, the distance matrix includes data indicative of human perceptions of lighting effects under different multi-settings of the luminaires. In some implementations, the distance matrix includes data indicative of sensor measurements of lighting effects under different multi-settings of the luminaires.

In some implementations: (a) the axes of the control variables are orthogonal to each other and at least one control variable has an axis that is highly correlated with a first principal component of a rank p matrix; (b) p is greater than n, where n is the number of control variables in the control space $\Omega$; and (c) the rank p matrix includes data that is indicative of human perceptions of lighting effects under different multi-settings of the luminaires.

In some implementations: (a) the axes of the control variables are vectors of principal components scores derived by principal component analysis from a rank p matrix; (b) p is greater than n, where n is the number of control variables in the control space $\Omega$; and (c) the rank p matrix is a mean-shifted and normalized mathematical representation of a set of data that is indicative of human perceptions of lighting effects under different multi-settings of the luminaires.

In some implementations: (a) the axes of the control variables are vectors of principal components scores derived by principal component analysis from a rank p matrix; (b) p is greater than n, where n is the number of control variables in the control space $\Omega$; and (c) the rank p matrix is a mean-shifted and normalized mathematical representation of a set of data that is indicative of sensor measurements of lighting effects under different multi-settings of the luminaires.

In some implementations: (a) the axes of the control variables are principal axes of a configuration, (b) the configuration is computed by an MDS algorithm; (c) the configuration comprises a lossy compression of a rank h matrix; (d) h is greater than n, where n is the number of control variables in the control space $\Omega$; and (e) the rank h matrix includes data indicative of human perceptions of similarity of lighting effects under different multi-settings of the luminaires In some implementations: (a) the axes of the control variables are axes of a common space (e.g., a group space) of a configuration; (b) the configuration is a dimension weighted MDS representation of a rank h matrix; (c) h is greater than n, where n is the number of control variables in the control space $\Omega$; and (d) the rank h matrix includes data indicative of human perceptions of similarity of lighting effects under different multi-settings of the luminaires.

Step 1205 of FIG. 12 involves deriving the control variables from a higher-dimensionality data matrix. In some cases, the output of, or method used in, step 1205 of FIG. 12 is described in any of the preceding eight paragraphs.

In some implementations, a computer does not re-compute the control variables (or control space) entirely from scratch each time that the illumination space is altered. For example, in some use scenarios, a human user creates a new luminaire multi-setting, thereby altering the illumination space $\Gamma$. One or more light sensors gather illuminance and spectral data while the room is illuminated according to the new multi-setting. A computer performs an algorithm that: (a) uses, as input, both these sensor readings and vectors (e.g., eigenvectors or component loadings) calculated earlier during a prior computation (e.g., a PCA computation); and (b) estimates coordinates of a point in the control space that represents the new multi-setting.

In illustrative implementations, one or more computers: (a) perform a dimensionality-reducing algorithm to calculate a set of independent variables (e.g., group-mean component scores or MDS coordinates) in a control space $\Omega$; and (b) perform a regression algorithm to compute a mapping from the independent variables in the control space $\Omega$ to dependent variables (e.g., luminaire multi-settings) in an illumination space $\Gamma$.

In some cases, the regression algorithm is a biharmonic spline interpolation algorithm. That is, a computer performs biharmonic spline interpolation in order to map from the independent variables in the control space $\Omega$ to the dependent variables (e.g., luminaire multi-settings) in an illumination space $\Gamma$. Biharmonic spline interpolation (BSI) is advantageous because BSI: (a) does not require a regular grid of independent variables in the control space $\Omega$; and (b) is able to estimate a nonlinear contour in the illumination space $\Gamma$.

Alternatively, in order to calculate a 1:1 mapping from points in a control space $\Omega$ to points in an illumination space $\Gamma$ (where each point in the control space maps to a unique point in the illumination space) a computer performs any other regression algorithm. Preferably, the regression algorithm does not require a regular grid of independent variables in the control space $\Omega$.

In illustrative implementations, a computer calculates a mapping from the control space $\Omega$ to the illumination space $\Gamma$ is one-to-one: that is, each point in the control space $\Omega$ corresponds to a unique point in the illumination space $\Gamma$. The mapping from the control space $\Omega$ to the illumination space $\Gamma$ is either a linear function or a non-linear function.

In some cases, a computer calculates a mapping (from the control space to the illumination space) and stores the mapping in a look-up table. Then, during operation of a control device: (a) an I/O device records data indicative of selection, by a human user, of a point in the control space; (b) a computer accesses the look-up table to determine a mapping from the selected point in the control space to a corresponding point (luminaire multi-setting) in the illumination space; (c) the computer outputs control signals to alter the settings of multiple luminaires in accordance with the luminaire multi-setting; and (d) physical attributes of multiple luminaires (e.g., temperature of different luminaires or current flowing through different luminaires) are altered such that the illumination outputted by the luminaires is in accordance with the luminaire multi-setting.

In illustrative implementations, a computer performs a regression algorithm (e.g., biharmonic spline interpolation) that takes, as an input, data representing a point in a lower-dimensional control space, and that outputs a mathematical representation of a luminaire multi-setting. This representation is defined in a mathematical space (an illumination space)

In some implementations, a computer calculates different regressions or different interpolants for different surfaces or different luminaires in a room, in order to map from a low-dimensional control space to a higher-dimensional luminaire multi-setting. For example, in some cases, a computer calculates different interpolant for downlighting and wallwashing luminaires. Also, in some cases, six different interpolations are used for the red, green, and blue channels for each type of luminaire (downlighting and wallwashing). Depending on the particular lighting configuration, the amount of interpolated surfaces that are calculated varies.

Step 1209 of FIG. 12 involves mapping the values of control variables to a multi-setting of luminaires. In some cases, step 1209 of FIG. 12 comprises a computer performing an algorithm that calculates a mapping in a manner described in any of the preceding seven paragraphs.

In illustrative implementations, the control space and illumination space are each mathematical spaces. For example, in some cases, the control space and illumination each comprise a vector space or a vector subspace. More generally, any one or more of the control space, illumination space, and observation space comprises a vector space (as that term is used in mathematics), metric space (as that term is used in mathematics) or topological space (as that term is used in mathematics).

In some implementations, a user controls illumination in a room by selecting a point in a control space, and then later fine-tunes the illumination by directly adjusting one or more setpoints, one setpoint at a time (e.g., by adjusting a physical slider that controls luminance of only a single luminaire.)

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

BRIEF DESCRIPTION OF THE DRAWINGS

FIG. 1A shows an example of three different luminaire multi-settings.

FIG. 1B shows an example of two control variables. The two control variables are used to control illumination, and are represented by displacement along two parallel axes.

FIGS. 3A to 3I show nine examples of how selection of different points (with different x,y coordinates) on a screen cause a room to be illuminated according to different multi-settings of luminaires. In each of these nine examples: (a) the left side shows a particular point on a GUI screen, and (b) the right side shows a corresponding lighting pattern created a particular luminaire multi-setting, which multi-setting is chosen by selecting that particular point on the GUI screen.

Figure 2A:
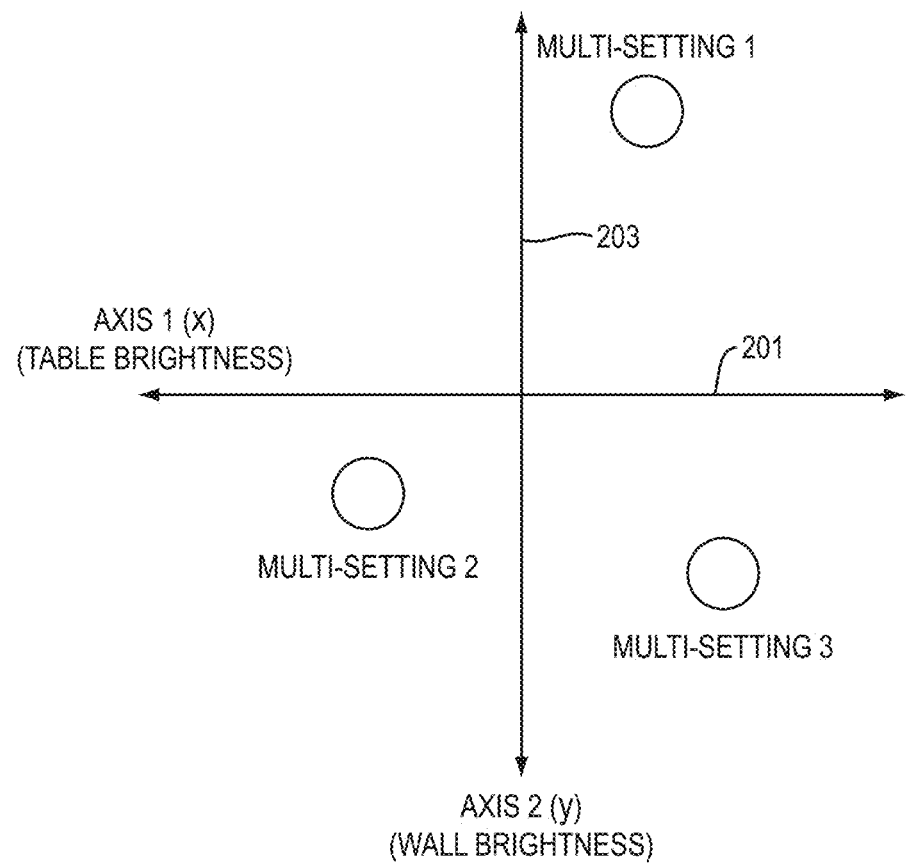
FIG. 2A shows another example of two control variables. The two control variables are used to control illumination, and are represented by displacement along two orthogonal axes—that is, by x,y coordinates in a plane.

The above Figures show some illustrative implementations of this invention, or provide information that relates to those implementations. However, this invention may be implemented in many other ways.

DETAILED DESCRIPTION

FIG. 1A shows three different luminaire multi-settings 101, 103, 105. These three multi-settings each correspond to a different lighting effect for a room (not shown in FIG. 1A). Each of these lighting effects is created by multiple luminaires (not shown in FIG. 1A).

In the example shown in FIG. 1A, each luminaire multi-setting is a permutation of values of eight separate illumination variables. The value of each illumination variable is represented by displacement of a slider (e.g., 107) along a linear axis (e.g., 109). There are eight sliders for each multi-setting (e.g., 101), one slider per illumination variable. Each illumination variable controls an attribute of illumination produced by one or more luminaires (not shown in FIG. 1A).

In the example shown in FIG. 1B, two control variables are used to control illumination. The two control variables are represented by displacement along two parallel axes 111, 113. The control variable represented by displacement along axis 111 is table brightness. The control variable represented by displacement along axis 113 is wall brightness. In FIG. 1B, positioning a slider at point 115 on axis 111 and a slider at point 117 on axis 113 causes the same lighting effect to be produced as would be achieved, in Figure A, by positioning eight sliders in the arrangement shown in multi-setting 105.

Thus two dimensions of control variables in FIG. 1B correspond to eight dimensions of luminaire illumination variables in FIG. 1A. Advantageously, it is easier and more intuitive for a human user to move only two sliders (such as the two sliders shown in FIG. 1B), rather than to move eight sliders (such as the eight sliders shown in FIG. 1A).

In the example shown in FIG. 2A, two control variables are used to control illumination. These two variables are represented by displacement along two orthogonal axes 201 and 203. Similar to FIG. 1B, the control variable represented by displacement along axis 201 is table brightness. The control variable represented by displacement along axis 203 is wall brightness. The fact that the axes are displayed as perpendicular to each other means that values of the two control variables are easily represented by x,y coordinates in a plane. For example, in some cases, the values of two control are represented by the x,y coordinates of a position on a capacitive touch screen, which position is selected by a human user by touching the screen.

Figure 2B:
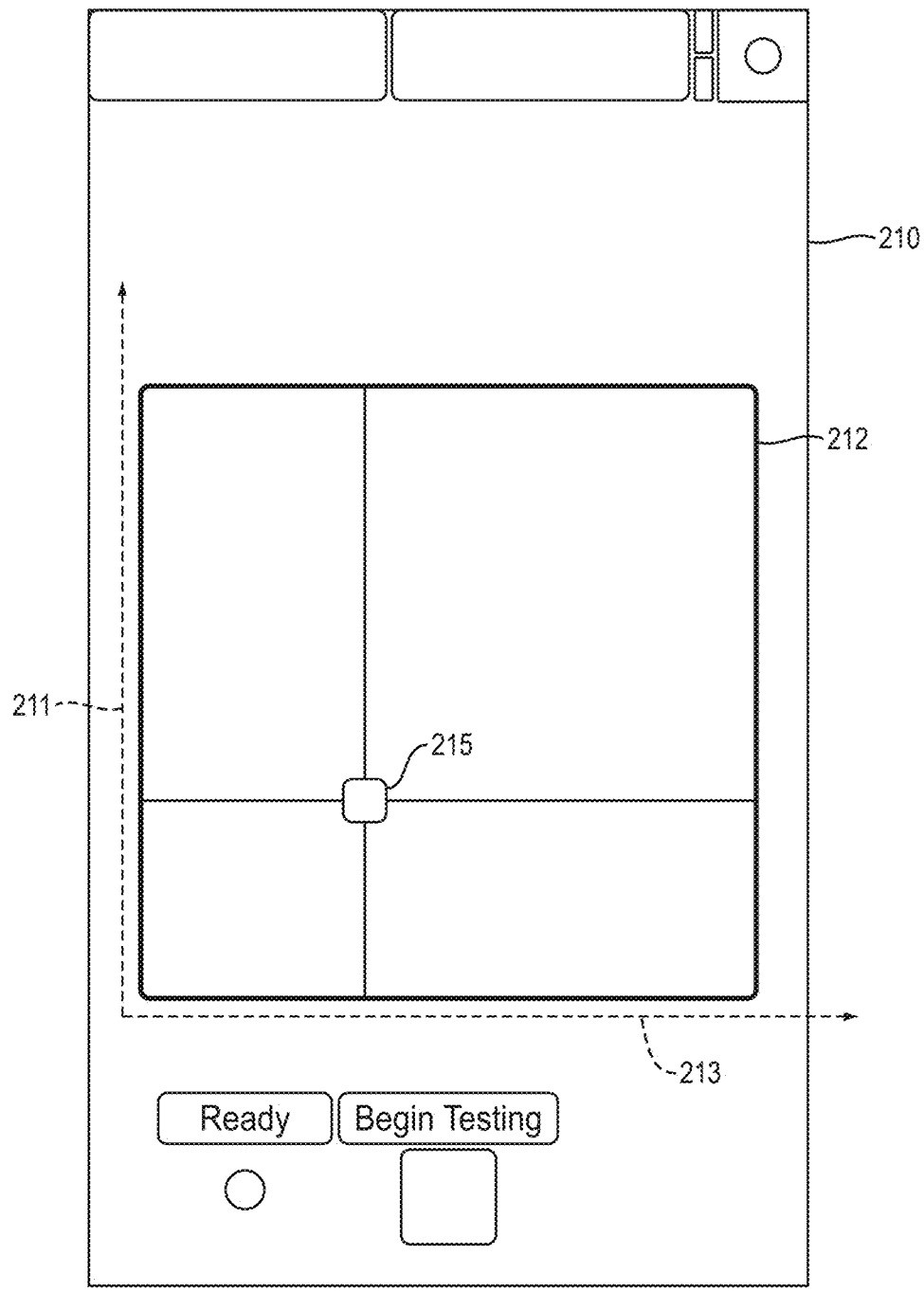
FIG. 2B shows a mobile computing device, with a screen that displays a graphical user interface. An x,y coordinate on the screen corresponds to values of two control variables used to control illumination.

FIG. 2B shows a mobile computing device 210, with a GUI (graphical user interface) screen 212. An x,y coordinate of the screen corresponds to values of two control variables used to control illumination. In the example shown in FIG. 2B, the vertical axis (y axis) 211 of the screen corresponds to a control variable called "appearance". So-called "appearance" is a measure of overhead/wallwash illumination. The horizontal axis (x axis) 213 of the screen corresponds to a control variable for color. The x coordinate of a selected point (e.g., 215) of the screen corresponds to a value of the color variable. The y coordinate of the selected point (e.g., 215) of the screen corresponds to a value of the "appearance" variable.

Figure 2C:
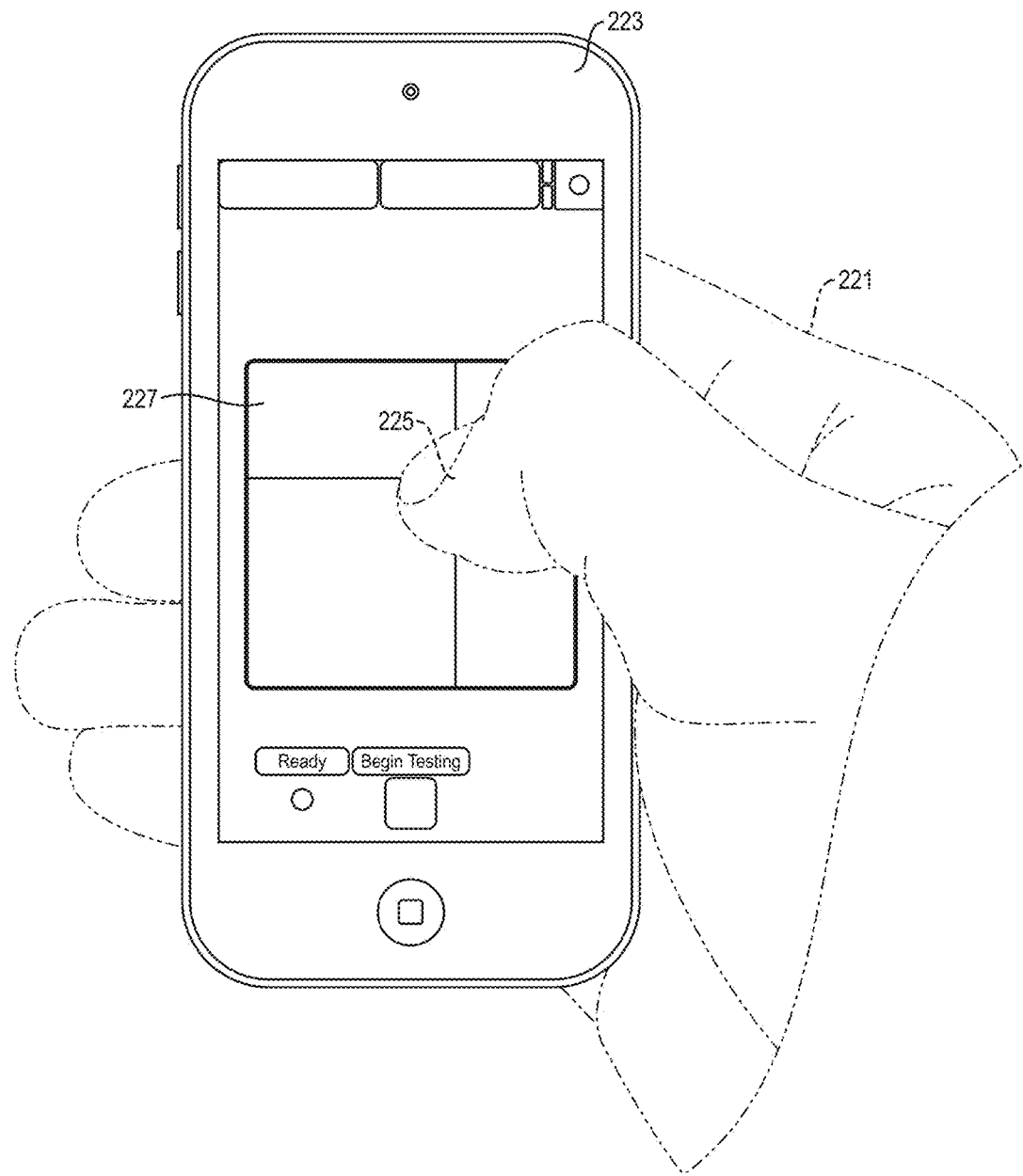
FIG. 2C shows a user holding a mobile computing device and selecting a position on the screen of the device. The position on the screen has x,y coordinates that correspond to values of two control variables that are used to control illumination.

FIG. 2C shows a user 221 holding a mobile computing device 223 and selecting a position 225 on the screen 227 of the device, which position has x,y coordinates that correspond to values of two control variables that are used to control illumination.

FIGS. 3A to 3I show nine examples of how selection of different points (with different x,y coordinates) on a screen cause a room to be illuminated according to different multi-settings of luminaires. In each of these nine examples: (a) the left side shows a particular point on a GUI screen, and (b) the right side shows a corresponding lighting pattern created a particular luminaire multi-setting, which multi-setting is chosen by selecting that particular point on the GUI screen.

The luminaire multi-setting is chosen by selecting that particular point on the GUI screen. For example: (a) selecting point 301 on the screen causes luminaires to produce illumination pattern 303 (FIG. 3A); (b) selecting point 305 causes luminaires to produce illumination pattern 307 (FIG. 3B); (c) selecting point 311 causes luminaires to produce illumination pattern 313 (FIG. 3C); (d) selecting point 315 causes luminaires to produce illumination pattern 317 (FIG. 3D); (e) selecting point 321 causes luminaires to produce illumination pattern 323 (FIG. 3E); (f) selecting point 325 causes luminaires to produce illumination pattern 327 (FIG. 3F); (g) selecting point 331 causes luminaires to produce illumination pattern 333 (FIG. 3G); (h) selecting point 335 causes luminaires to produce illumination pattern 337 (Figure H); and (i) selecting point 341 causes luminaires to produce illumination pattern 343 (FIG. 3I).

Figure 4:
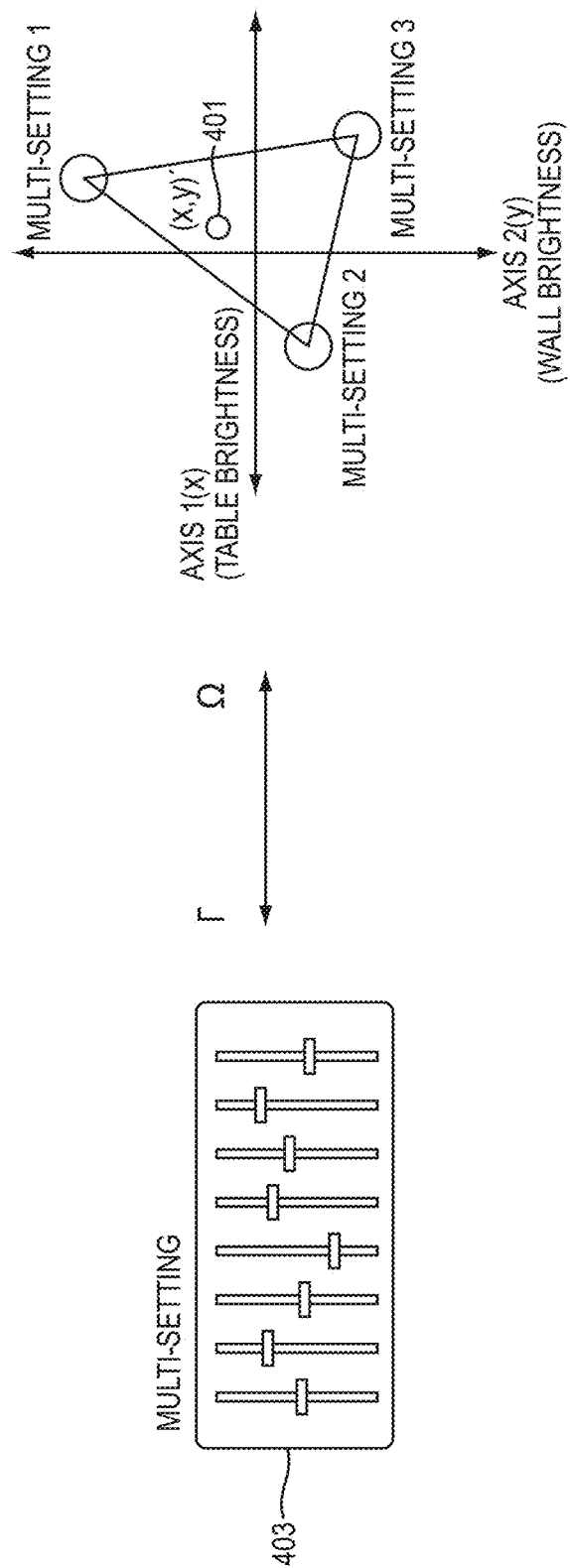
FIG. 4 shows a mapping between (1) a point with x,y coordinates in a control space Ω and (2) a luminaire multi-setting in an illumination space Γ.

FIG. 4 is a conceptual diagram, which shows a mapping between (A) a point 401 with x,y coordinates in a control space Ω and (B) a luminaire multi-setting 403 in an illumination space Γ. Both Ω and Γ are mathematical spaces. In the example shown in FIG. 4, Ω is a two-dimensional space, and Γ is an eight-dimensional space.

Figure 5:
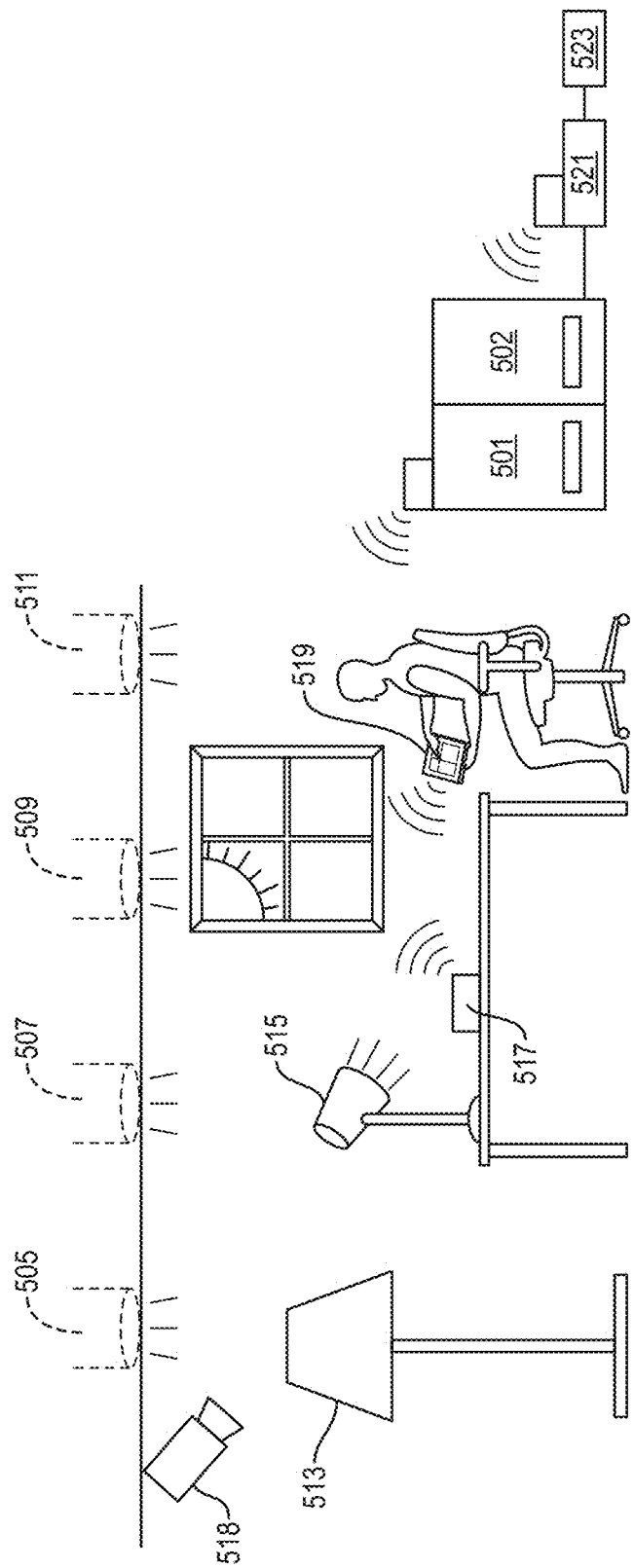
FIG. 5 shows an example of hardware components, in an illustrative implementation of this invention.

FIG. 5 shows an example of hardware components, in an illustrative implementation of this invention.

In the example shown in FIG. 5, one or more computers 501, 502 execute algorithms, including algorithms (a) to accept input regarding human perceptions (or sensor readings) of lighting effects under different luminaire multi-settings; (b) to calculate a high-dimensional data matrix that represents this input; (c) to perform a dimensionality-reducing algorithm to calculate a lower dimensional approximation of the data matrix and determine control variable axes (vectors); (d) to map values of the control variables to a luminaire multi-setting (or to look up values indicative of this mapping); and (e) to control dimmers 521, 523 such that the dimmers adjust luminaires according to the multi-setting.

The one or more computers 501 output control signals to control a set of dimmers (e.g., 521, 523). The dimmers 521, 523 control the intensity and color of light emitted by a set of luminaires (e.g., 505, 507, 509, 511, 513, 515) by controlling voltage or current provided to the luminaires. For example, in many cases, the dimmers 521, 523 control achromatic light intensity and color of light emitted by the luminaires. For example, in some cases, the dimmers 521, 523 control color by controlling relative intensity of different color channels, such as red, green and blue. In many cases, the dimmers are semiconductor devices that: (a) modulate voltage or current by rapidly switching on and off; and (b) control the RMS (root mean square) voltage or current provided to the luminaires by adjusting the phase angle of the modulation. For example, in many cases, the dimmers control the RMS voltage or current by controlling the time—during each period of an AC (alternating current) input—at which the dimmers switch on. In some cases, the dimmers include variable resistors (e.g., potentiometers or rheostats).

In illustrative implementations, the luminaires comprise wall lights, ceiling lights, track lighting fixtures, floor lamps, desk lamps, table lamps, or so-called "uplighting" or "downlighting" fixtures. In illustrative implementations, at least some of the luminaires each emit (when "on") more than 400 lumens, more than 600 lumens, more than 800 lumens, more than 1000 lumens, or more than 1500 lumens. In illustrative implementations: (a) the luminaires are not pixels in a computer monitor; and (b) are not components in an electronic display screen that comprises a single integral structure.

In illustrative implementations, one or more light sensors take measurements of intensity or color of light. In some cases, the light sensors are housed in a lightweight portable sensor unit 517. In the example shown in FIG. 5, the sensor unit has an external shape similar to a hockey puck. In some cases, one or more light sensors (e.g., 518) are affixed to a ceiling or wall. The light sensors (e.g., 517, 518) measure both (a) light emitted by the luminaires; and (b) ambient light, such as sunlight that enters a room through a window. In some cases, data from the light sensors provides feedback used in lighting control. In some cases, the light sensors (e.g., 517, 518) comprise a spectrometer, luminance meter or camera.

In illustrative implementations, a mobile computing device (such as a smartphone or laptop computer) 519 includes a GUI screen. The GUI screen records input from one or more human users and displays output to the user(s). For example, in some cases, the GUI screen records input regarding values of control variables, which values are represented by the coordinates of one or more positions on the screen. These positions are selected by a human user (e.g., by touching a touch screen at a particular location, or by using a mouse or keyboard).

In illustrative implementations, the mobile computing device 519 and the sensor unit 517 communicate (wirelessly, or via a wired connection) with other devices, including one or more computers 501. If a wireless communications are used, then one or more devices in the system include wireless transceivers, receivers or transmitters for receiving or transmitting wireless signals.

In a prototype of this invention, the user-interface (GUI) runs on a capacitive touch screen of an Apple® iPod®. The lighting control software for the GUI is as written using the touchOSC library available for mobile devices. The iPod® transmits data wirelessly to a data logging personal computer (PC). The communication interface between the data logging PC and the iPod® is bidirectional, and the state of the lighting conditions and user-interface are synchronized. The PC, in turn, transmits lighting control data to a Color Kinetics® control module (the Data Enabler Pro). This control module, in turn, adjusts lighting conditions in a room. The lighting interface provides real-time control of the luminaires.

In this prototoype, there are two different lighting control graphical user-interfaces (GUIs). The user uses either one of these GUIs.

In this prototype, the first GUI is derived using subjective impressions of lighting. The domain of the two-dimensional lighting configuration is linearly rescaled and normalized to [0, 1]×[0, 1]. This allows the mapping to span the entire range of this GUI running on the iPod®. In this GUI, eight lighting scenes are reachable (from a controls standpoint) and the nonlinear interpolated control values follow from two-dimensional interpolation of these eight scenes. A user employs this first GUI to adjust the appearance of a room (brightness and contrast) and color. In this prototype, the second GUI is a control that consists of single degree-of freedom sliders which adjust the individual luminaire's flux and buttons to toggle the color. The linear slider interface comprises conventional sliders used to adjust the intensity of luminaires. This second GUI (with a slider user-interface) is modeled as a direct mapping of intensity to each of 8 luminaires. Therefore, intensity control was set to a 1:1 mapping, with 9 degrees of freedom (eight sliders and warm/cool adjustment). Adjustments in color-temperature are made by pressing a warm or cool button on the GUI. In some use scenarios, a user employs this second GUI to create new luminaire multi-settings, or to fine-tune illumination by directly adjusting luminaire setpoints.

Figure 6:
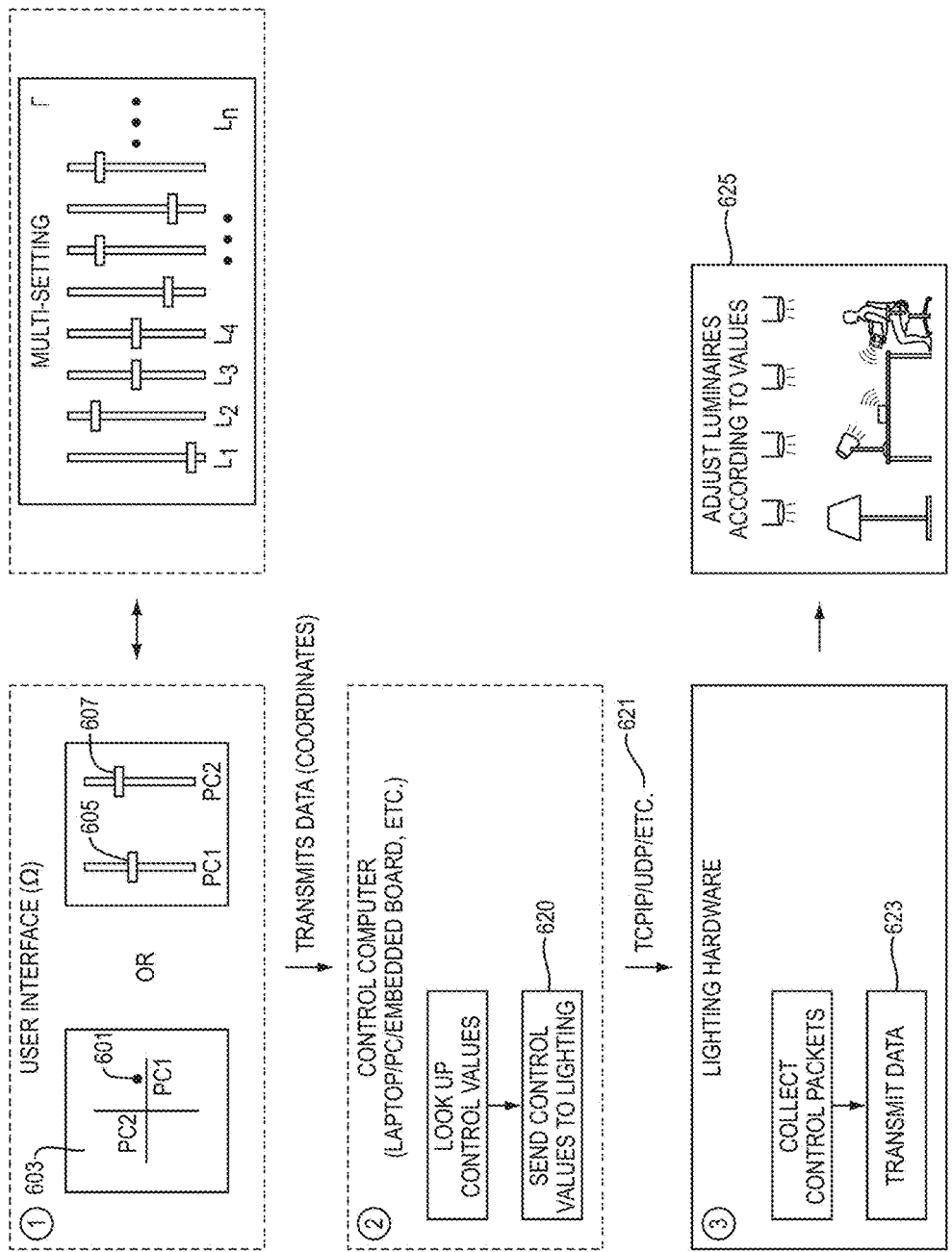
FIG. 6 is a flowchart of steps in a method, in which a user selects values of two control variables.
Figure 7:
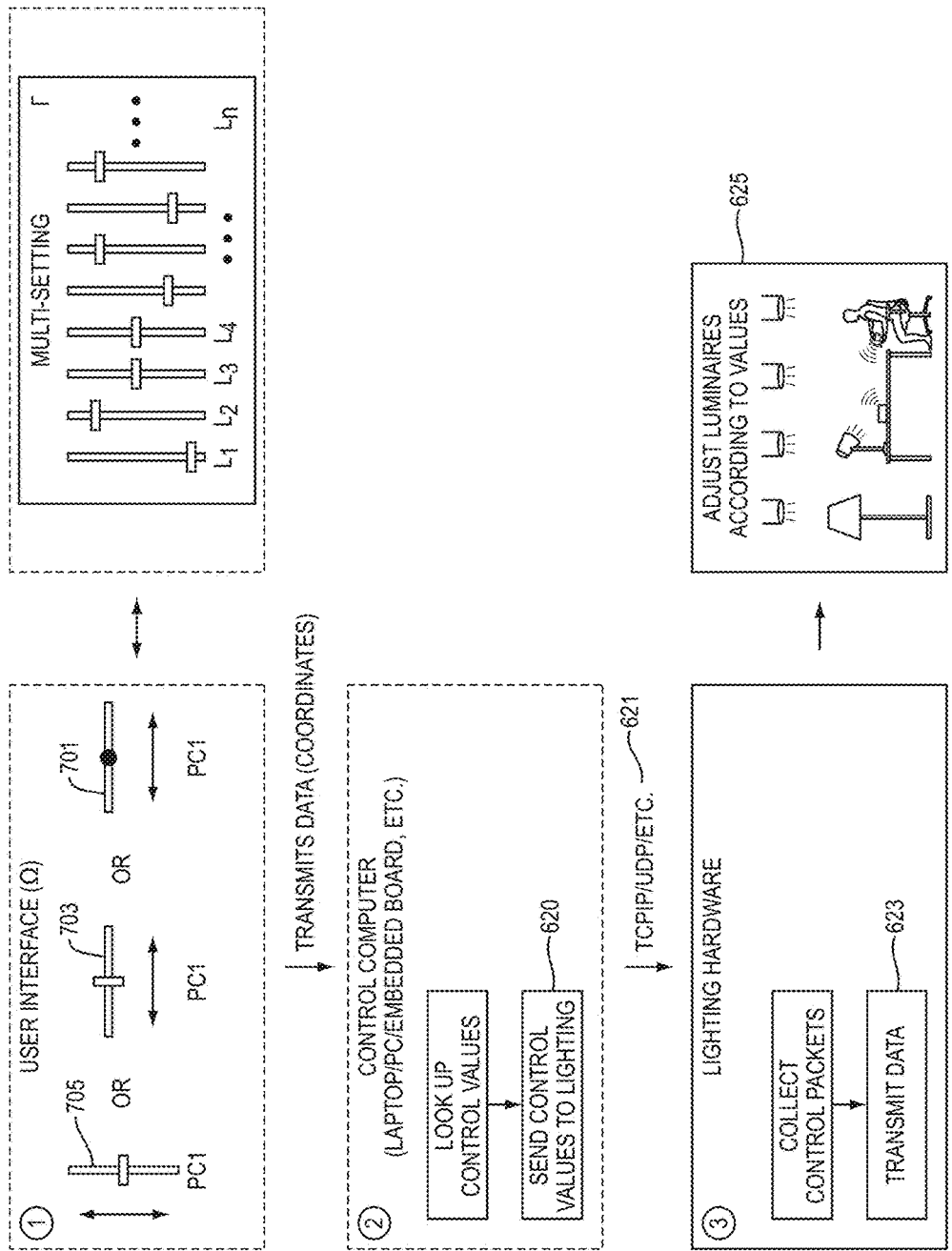
FIG. 7 is a flowchart of steps in a method, in which a user select values of one control variable.
Figure 8:
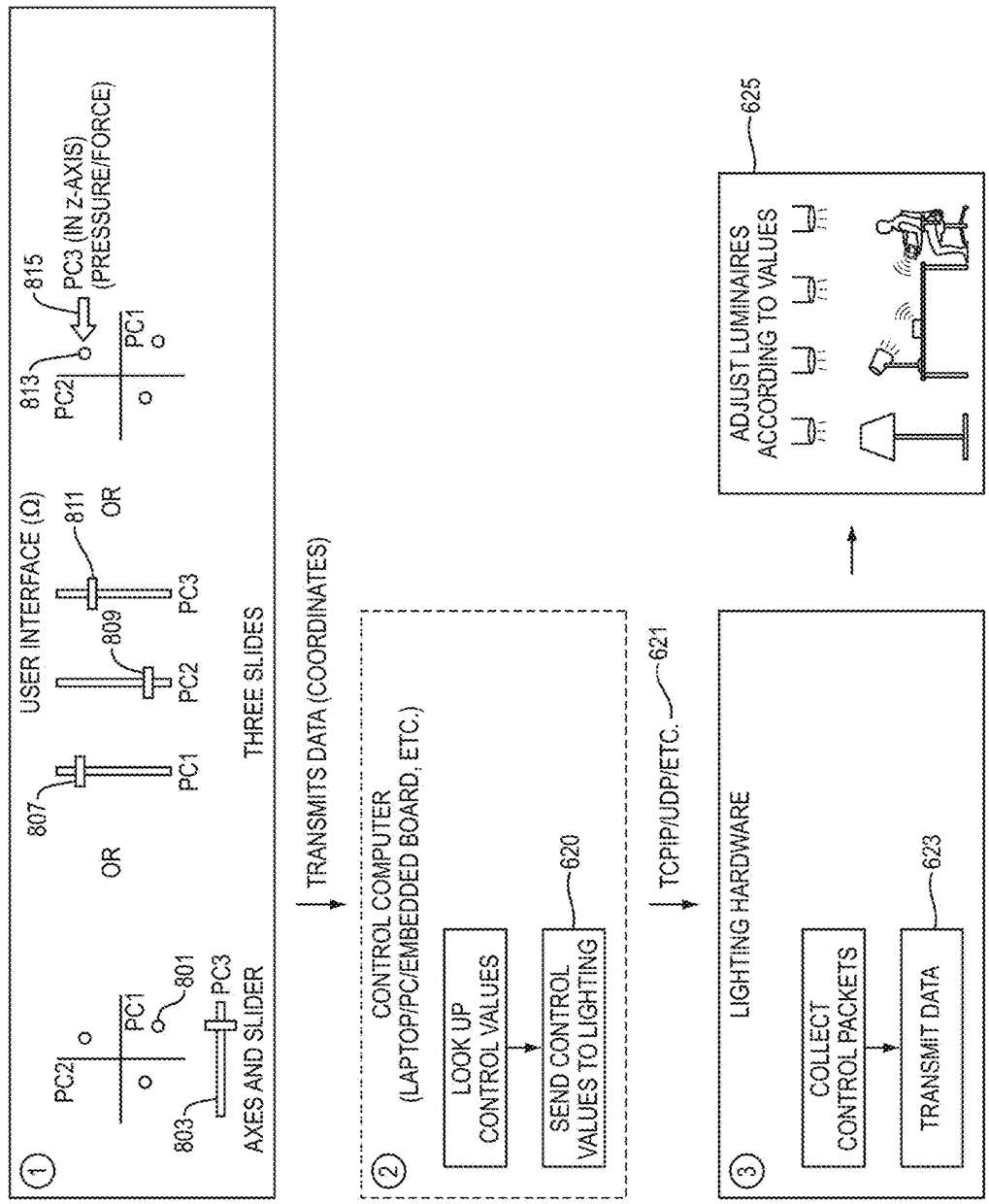
FIG. 8 is a flowchart of steps in a method, in which a user selects values of three control variables.

FIGS. 6, 7, and 8 are each a flowchart of steps in a method, in which selection of values of a control variable (or of control variables) causes an adjustment of light emitted by luminaires. In the method shown in FIG. 6, there are two control variables; in FIG. 7 there are three control variables; and in FIG. 8 there is one control variable.

In FIG. 6, a specific permutation of values of the two control variables is mapped by a computer to a specific luminaire multi-setting. Similarly, in FIG. 7, the value of a single control variable is mapped by a computer to a specific luminaire multi-setting. Likewise, in FIG. 8, a specific permutation of values of the three control variables is mapped by a computer to a specific luminaire multi-setting.

In the example shown in FIG. 6, the values of two control variables are indicated by either (a) the x, y coordinates of a selected point 601 in a plane 603 (e.g., a planar touch-screen); or (b) the displacement of two linear sliders 605, 607.

In the example shown in FIG. 7, the value of a single control variable is indicated by either (a) displacement along a single axis 701 of a plane (e.g., a planar touch-screen); or (b) the displacement of a single linear slider (703 or 705).

In the example shown in FIG. 8, the values of three control variables are indicated by either (A) the x, y coordinates of a selected point 801 and displacement of a single linear slider 803; (B) the displacement of three linear sliders 807, 809, 811; or (C) the x, y coordinates of a selected point 813 and amount of pressure 815 applied to that point.

In FIGS. 6, 7 and 8, once input is received from a human indicating selected values of the control variables, a computer uses a look-up table to map the selected values of the control variables to a luminaire multi-setting, and sends packets of signals to lighting hardware (Step 620). The packets are sent in accordance with a networking protocol (e.g., an Internet protocol suite, including TCP, IP and UDP) (Step 621). The lighting hardware collects the packets and transmits data (Step 623). The transmitted data controls dimmers, such that the dimmers adjust the intensity or color of luminaires (Step 625).

Figure 9:
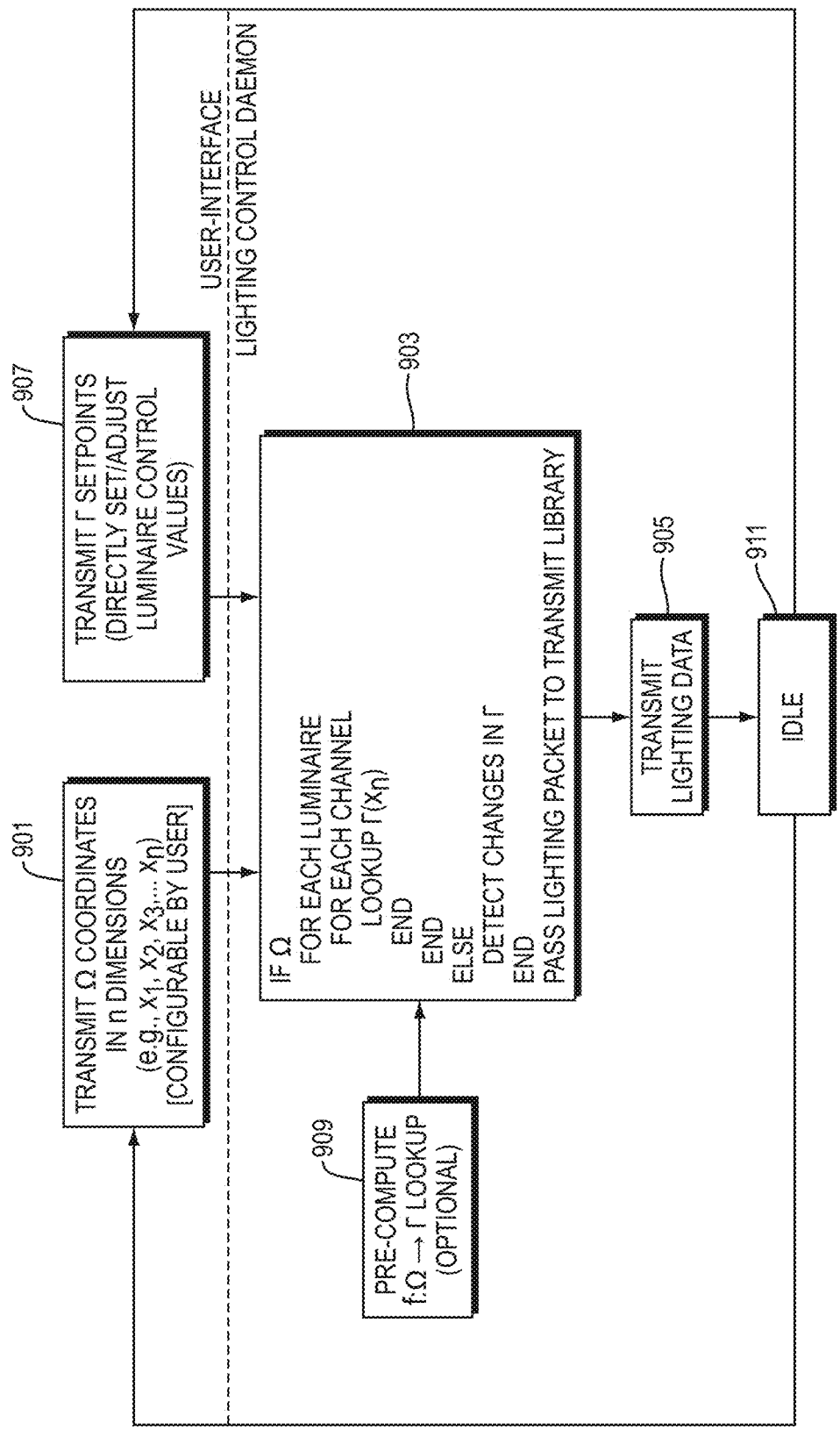
FIG. 9 is a flowchart of steps in a method for controlling illumination.

FIG. 9 is a flowchart of steps in a method for controlling illumination. In this method, I/O devices accept input from a human user and transmit data indicative of inputted values of n separate control variables—that is, indicative of inputted coordinates of an n-dimensional point in a control space $\Omega$ (Step 901). If new input is received from the I/O devices regarding values of the control variables, then a computer maps the n-dimensional point in control space $\Omega$ to a m dimensional point in illumination space $\Gamma$. The computer looks up a value (in a look-up table) for each channel (e.g., red, green and blue) for each luminaire. (Step 903). Lighting data is transmitted from the computer to dimmers to control luminaires (Step 905).

Fine-Tuning: In some cases, a user inputs instructions to directly change a luminaire setting. As used herein, an instruction to "directly" change a luminaire setting means (a) an instruction to change the setpoint of only a single luminaire, or (b) an instruction to change the setpoints of a group of luminaires, such that the setpoints of the group are all a function of a setpoint of a single luminaire. For example, in some cases, after a user inputs values of control variables to indirectly adjust a luminaire multi-setting (in the manner described in the preceding three paragraphs), the user then fine-tunes the resulting illumination by inputting instructions to directly adjust a luminaire setting. (That is, the user inputs instructions to make changes directly in illumination space $\Gamma$.) I/O devices record this input and transmit these instructions for directly adjusting the luminaire setpoints. (Step 907) If new input is received regarding a direct adjustment of a luminaire setting (an adjustment directly in illumination space $\Gamma$), then the computer outputs instructions to make this direct adjustment.

In some cases, a computer computes, in advance, a look-up table. The look-up table maps each n-dimensional point in control space $\Omega$ to a m-dimensional point in illumination space $\Gamma$—that is, maps from each permutation of values of n control variables to a m-dimensional luminaire multi-setting. (Step 909)

After adjustments are made to the luminaires, the system is idle (Step 911), until new input is received regarding either (A) values of control variables or (B) a direct adjustment to luminaire settings.

Figure 10:
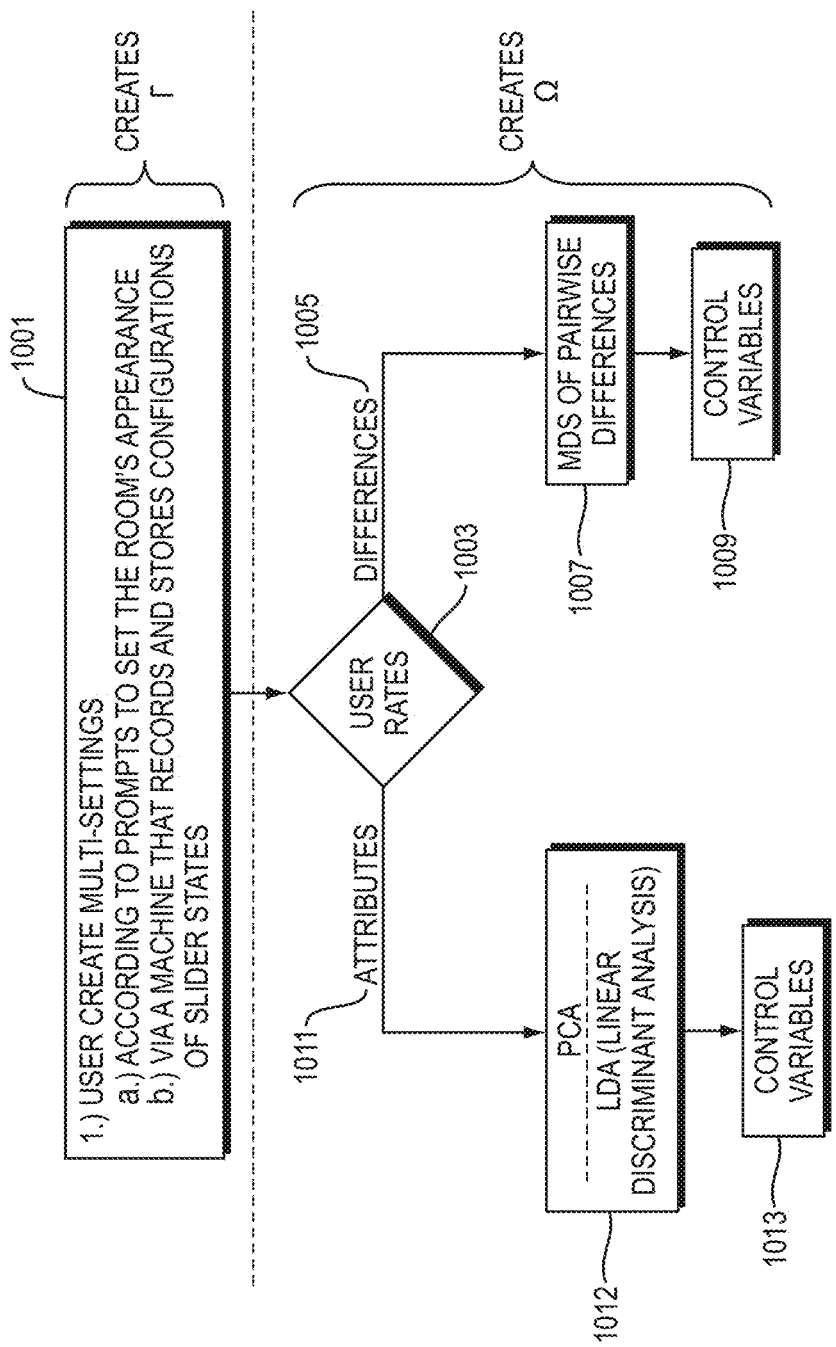
FIG. 10 is a flowchart of steps in a method, in which data gathered regarding human perceptions of different lighting conditions is used to determine control variables in a control space.

FIG. 10 is a flowchart of steps in a method, in which data gathered regarding human perceptions of different lighting conditions is used to determine control variables in a control space.

In the example shown in FIG. 10, a user inputs instructions to directly adjust luminaire setpoints, thereby creating different luminaire multi-settings. A computer stores data regarding the setpoints used to create these luminaire multi-settings. (Step 1001)

The illumination of the room changes, as the luminaires light the room according to these different (user-created) multi-settings. A user provides input regarding the user's perception of the lighting effects created by these different multi-settings. (Step 1003)

In the example shown in FIG. 10, if the user input describes user perceptions of the degree of dissimilarity (or degree of similarity) between different pairs of lighting effects caused by the different multi-settings (Step 1005), then a computer performs MDS (Step 1007) in order to compute a control space in which the control variables are determined by the MDS (Step 1009).

In MDS, a computer takes a symmetric matrix of "distance" data (e.g., a measure of how far two lighting scenes are from each other) and reconstructs a basis in some number of dimensions where the estimated interpoint distances are as close as possible to the original set of distances. In some cases, a computer finds a set of coordinates (given a user-specified number of dimensions) according to the average distance between all points obtained from the users. The INDSCAL approach to MDS is a special form of a k×m×n formulation of the problem for solving MDS problems while taking into account individual differences.

In the example shown in FIG. 10, if the user input describes user perceptions of attributes (other than pairwise similarity/dissimilarity) of the lighting effects caused by the different multi-settings (Step 1011), then a computer performs PCA (Step 1012) in order to compute a control space in which the control variables are principal components determined by the PCA (Step 1013).

In some cases, a computer performs a PCA algorithm that takes a high-dimensional m×n data matrix (representing a set of subjective or objective data, or a combination of both) as input, performs dimensionality-reduction and outputs mean component scores. The component scores are an m×n' matrix where n'<n. For example, if two control variables are used, then n'=2. In some cases, to account for individual differences (e.g., natural distinctions amongst observers), the underlying data is represented as a k×m×n dataset where k is the number of observers.

Consider the following example: 2 people rate 3 lighting scenes and a computer calculates the component scores of their response data in 2 dimensions, as follows:

TABLE 1

PCA Example.

| Subject | PC1 | PC2 | Scene |
|---|---|---|---|
| 1 | .2314 | −.2389 | 1 |
| 1 | .3453 | −.4368 | 2 |
| 1 | −.2484 | .4782 | 3 |
| 2 | .2372 | −.2580 | 1 |
| 2 | .3792 | −.4740 | 2 |
| 2 | −.2780 | .4900 | 3 |

In this example, the group-mean (the midpoint in the n' subspace given the component score) is the mean score for each scene aggregated over all the rows. For example, the mean score of PC1, Scene 1=(0.2314+0.2372)/2 and PC2, Scene 1=(−0.2389−0.2580)/2.

Figure 11:
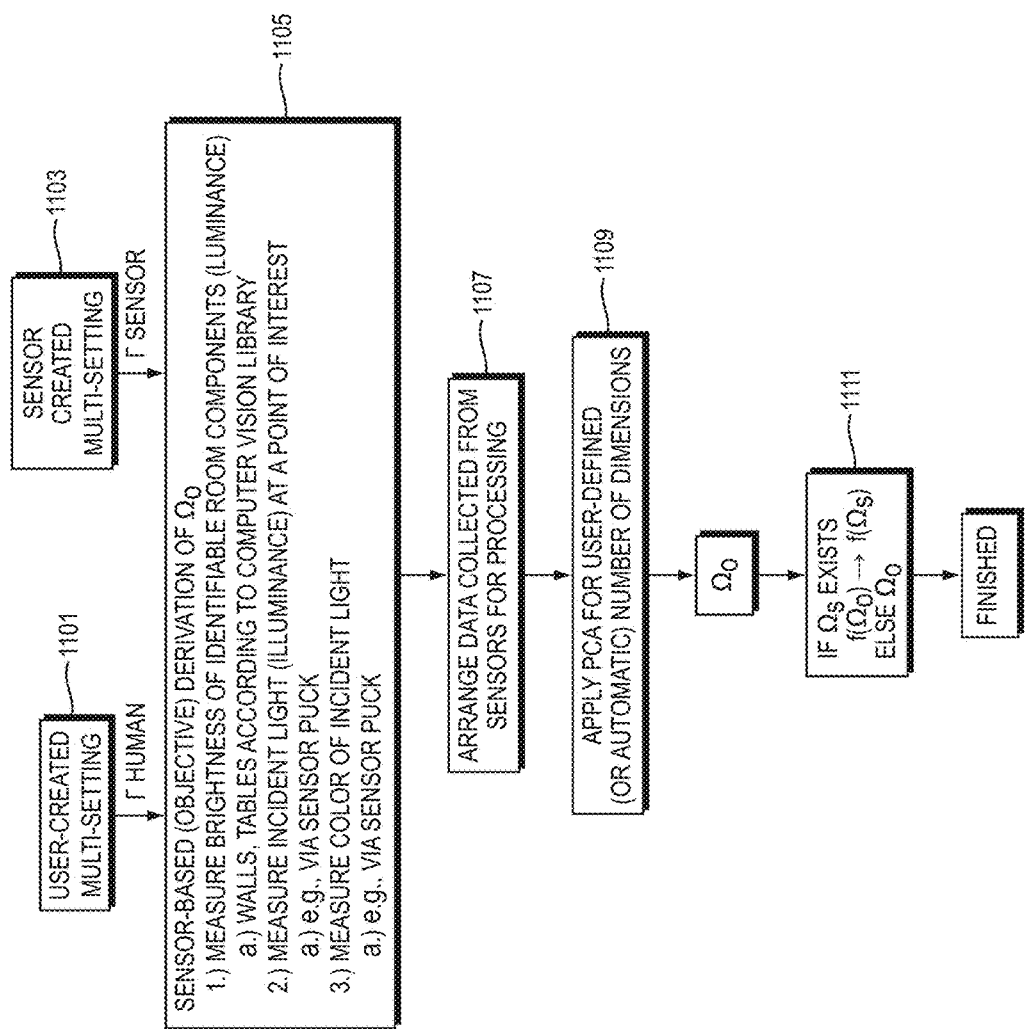
FIG. 11 is a flowchart of steps in a method, in which sensor readings of different lighting effects are used to determine control variables in a control space.

FIG. 11 is a flowchart of steps in a method, in which sensor readings of different lighting effects are used to determine control variables in a control space.

First, luminaire multi-settings are created, either (a) pursuant to input indicative of user instructions to directly adjust luminaire setpoints (Step 1101), or (b) pursuant to sensor measurements of different lighting effects (Step 1103).

Then objective data is used to derive control variables for use in a control space Ω. Sensors collect data to measure: (a) intensity of light reflected from room components (e.g., walls and tables) according to a computer vision library; (b) total intensity of light incident at a particular sensor; and (c) color of light. (Step 1105).

Then a computer arranges the sensor data for processing (Step 1107), and applies principal component analysis (PCA) for a user-defined (or automatic) number of dimensions (Step 1109). If the control space Ω already has previously-computed control variables, then the newly computed principal components become the new control variables in the control space Ω, replacing the previous control variables. If the control space Ω does not have previously-computed control variables, then the newly computed principal components become the control variables in the control space Ω. (Step 1111)

Figure 12:
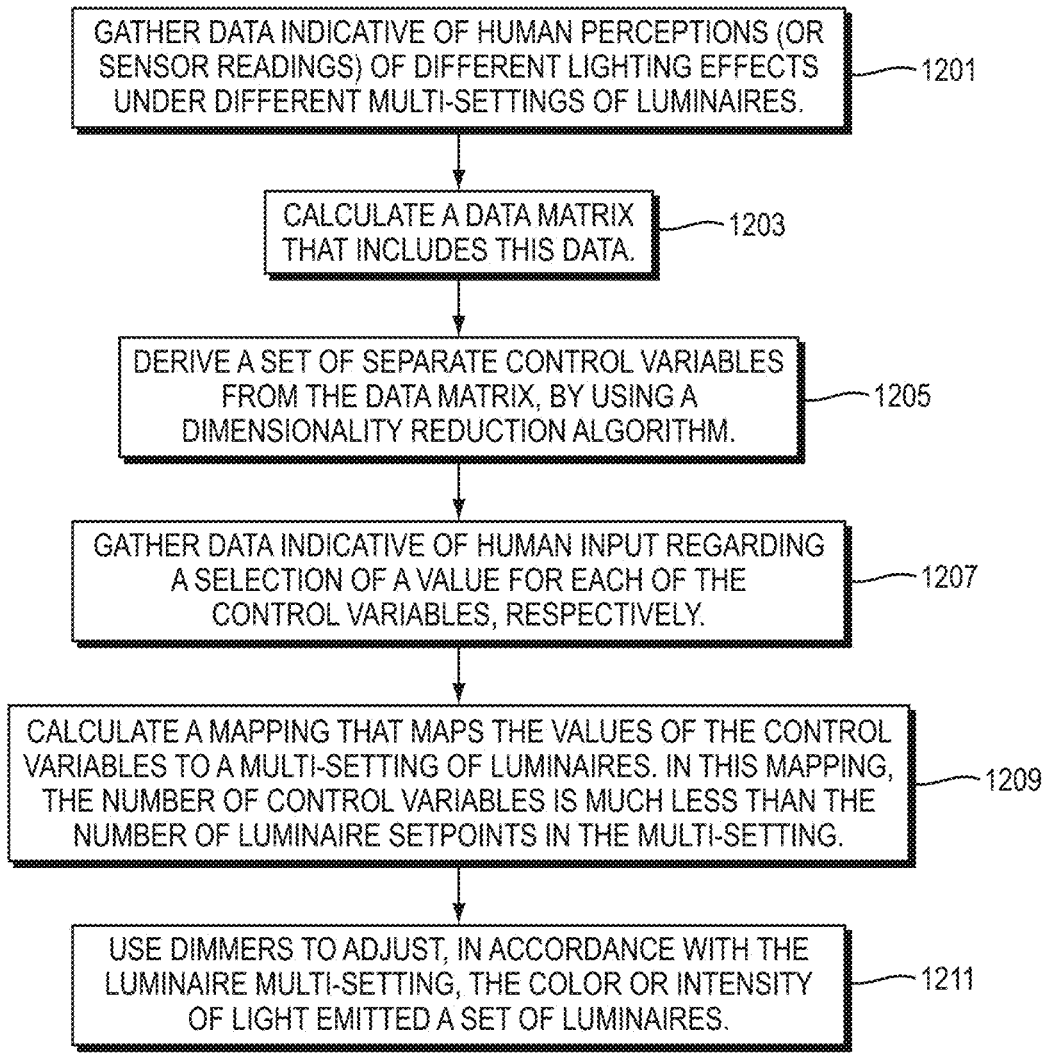
FIG. 12 is a flowchart of steps in a method for controlling luminaires.

FIG. 12 is a flowchart of steps in a method for controlling luminaires. The steps include: Gather data indicative of human perceptions or sensor readings of different lighting effects under different multi-settings of luminaires (Step 1201 Calculate a data matrix that includes this data (Step 1203). Derive a set of separate control variables from the data matrix, by using a dimensionality reduction algorithm. (Step 1205). Gather data indicative of human input regarding a selection of a value for each of the control variables, respectively (Step 1207). Calculate a mapping that maps the values of the control variables to a multi-setting of luminaires. In this mapping, the number of control variables is much less than the number of luminaire setpoints in the multi-setting (Step 1209). Use dimmers to adjust, in accordance with the luminaire multi-setting, the color or intensity of light emitted a set of luminaires (Step 1211).

In the examples shown in FIGS. 11 and 12, the sensor readings comprise measurements taken by a spectrometer, luminance meter or camera.

Here is an example of using a control model derived from sensor-based (objective) data. In this example, the control model describes differences in brightness between facets of the room and changes in illuminance and color. Principal component analysis is used extract and model independent dimensions of variation in the dataset. A model is derived using both illuminance and spectral data. In this prototype, the dataset comprises 96 row entries and 18 column entries. Thus, there are 1728 elements in the 96×18 data matrix. Each scene is represented by 6 row entries in the matrix. Each of these six entries corresponds to the facets of the room (left wall, right wall, front wall, back wall, ceiling, and table, respectively). The first five columns of each row correspond to the four corner and center illuminance measurements. The remaining 13 columns corresponds to spectral data down-sampled to 25 nm increments (range 400 nm to 700 nm). This is then replicated for all 8 lighting scenes. Thus, in this dataset, the variation in brightness is described in the first five columns and the variation in color and work surface illuminance is described in the remaining 13 columns. When the data are projected onto their first two eigenvalues, the result is a representation of the scenes in two dimensions.

In exemplary implementations, I/O devices record input that is indicative of subjective data regarding preceptions of lighting scenes. This input is used to assess perceptual and affective characteristics of lighting. For example, in some cases, the input is in the form of answers to a survey presented by a graphical user interface (GUI).

In exemplary implementations, input data is accepted from a human user. A computer calculates affective and perceptual qualities of the lighting, by eigendecomposition of a lighting preference matrix that represents either subjective human measurements, sensor data, or a combination in both.

In illustrative implementations, a computer performs eigendecomposition of observed data. The choice of matrix factorization depends on the nature of the observed data. In some cases, the observed data are represented by a diagonalizable matrix. In illustrative implementations, a computer performs factorization of a matrix of observed data, to determine the eigenvalues (e.g., by singular value decomposition)

In an illustrative implementation, a computer projects high dimensional data (regarding human perceptions or sensor readings of lighting effects) onto a new mathematical basis (e.g., component scores) determined by the largest eigenvalues calculated in the analysis (the size of the eigenvalue reflects the variance explained in this new basis). In illustrative implementations, these new synthetic variables are orthogonal (e.g., a varimax rotation is applied).

In illustrative implementations, a computer projects the observation data onto a basis consisting of the first two dimensions. Thus, prior lighting data measured in multiple perceptual and physical dimensions is projected onto these new dimensions (or axes). Thus, this approach can be considered as a lossy compression of previously measured lighting scenes. In other words, discarding any eigenvalues in the analysis results in a loss of information.

Further, the location of these component scores (e.g., synthetic variables) in such a basis reflects an ordering and ranking of the latent features of the lighting scene. Typically, these latent dimensions are unknown to the user apriori and inferred through the analysis.

For example, in some use scenarios, a two dimensional basis reflects the perceived brightness of the luminaire multi-settings (the vertical axis) and spatial and location-specific effects in the second dimension (the horizontal axis).

Advantageously, this approach: (a) captures (in reduced dimensions) these higher-order effects; (b) works with a single person or multiple people; (c) can be updated to reflect new information; and (d) can be adapted to any room or space.

In some implementations, the observed data include sensor-based measurements captured by a simple photocell, or includes sensor measurements of reflected light in the scene (for example, the ratio of wall illuminance to work surface illuminance).

In some implementations in which observed data includes sensor-based measurements: cases: (a) a covariance matrix consisting of mixed-scale measurements (e.g., ordinal and ratio scale measures) is not homogeneous; and (b) a computer calculates a combination of both polychoric correlation and Pearson product-moment correlation coefficient (to properly reflect the mixed use of ordinal scale observations and ratio scale observations). Then, the computer proceeds with a principal component analysis.

Depending on the particular implementation of this invention, any arbitrary ranking and ordering of the prior observed scenes is used. In an exemplary approach, a computer uses the largest eigenvalues (as this maximizes the possibility of intuitive mapping of lighting settings).

In illustrative implementations, a computer estimates the relationship between the luminaire multi-settings (the dependent variables) and the new orthogonal component scores (the independent variables). A computer may use a wide variety of approaches to estimate this relationship (mapping). For example, in some cases, least squares regression, partial-least squares, or a non-linear approach, such as (ordinal) logistic regression, is used. Alternatively, in some cases, linear discriminant analysis is used (which maximizes the between-class distance of these compressed scenes). A computer estimates the coefficients, and then determines a mapping between the synthetic variables and the luminaire multi-settings.

The application of either a linear or non-linear regression reflects the decision about whether the dependent variable (e.g., the luminaire intensity setting) is considered discrete or continuous.

After a computer estimates this mapping, a human user can then control an arbitrary number of luminaires according to these principal components. For example, the user can now specify an (x,y) coordinate in this orthogonal basis (e.g., by selecting a point on a screen which has this (x,y) coordinate). A computer uses this (x,y) coordinate to determine the luminaire multi-settings according to the estimated regression coefficients. In this example, a regression model exists for every luminaire considered in the analysis; the coefficients (e.g., the intercept and the fixed effects of the synthetic variables) differ between models.

Thus, in illustrative implementations, a human's impression of any spatial, location, intensity, or distribution effects are primarily due to factors that are approximated by the ranking and ordering of the prior scenes and their subsequent compression using the first n eigenvalues. For any prior scene that has been evaluated, a "compressed" representation exists in this basis; thus scene selection using the principal components thus corresponds to a continuous approximate mapping between lighting presets.

These mappings are "intuitive" to a user because they reflect the user's own internal understanding of the lighting scenes. Yet, these mappings are not obvious, as a typical user is incapable of describing these complex relationships before using this approach.

In some implementations, the input data that is accepted includes data indicative of human rating, scoring or description of context for the lighting scene. For example, the human may rate or score lighting scenes defined by terms like "work," "play," or "rest."

In exemplary embodiments of this invention, spatial and perceived brightness characteristics of the lighting system are mapped onto the principal axes of lighting control. The affective and perceptual qualities of the lighting are derived using the eigendecomposition of a lighting preference matrix which comprises of either input data (derived from input indicative of subjective human measurements), sensor data, or a combination in both.

In exemplary embodiments of this invention, accepting input indicative of human labeling of lighting conditions, and using this input in the design and control of lighting, enables simplification of the lighting user-interface. In some cases, dials, sliders, or switches are remapped to semantic definitions of lighting. These are more intuitive to users than customary intensity sliders or static presets, and much more convenient when multiple fixtures and luminaires are involved.

Computers

In exemplary implementations of this invention, one or more electronic computers (e.g. 501, 502) are programmed and specially adapted: (1) to control the operation of, or interface with, hardware components of an illumination system, including any dimmer, light sensor or luminaire, including to control the intensity or color of light emitted by luminaires; (2) to process data from I/O devices indicative of human input regarding values of control variables or human instructions to directly adjust luminaires; (3) to process data from light sensors indicative of intensity of light reflected from certain areas in a room, or of overall intensity of a light source or sources; (4) to computer a mapping, interpolation or regression, or to look up a mapping, interpolation or regression, from a n-dimensional point in a control space $\Omega$ to a m-dimensional point in an illumination space $\Gamma$, where the coordinates of the n-dimensional point represent values of n separate control variables, and the coordinates of the m-dimensional point represent a luminaire multi-setting; (5) to control dimmers to adjust luminaires such that the output of the luminaires is in accordance with a luminaire multi-setting; (6) to process data from I/O devices indicative of human perceptions of lighting effects under different luminaire multi-settings; (7) to perform a dimensionality-reduction algorithm, that takes as an input a high-dimensional data matrix indicative of human perceptions (or sensor readings) of lighting effects under different luminaire multi-settings, and that outputs a lower-dimension approximation of the data matrix; (8) to determine one or more control variables, based on the calculated approximation; (9) to control a graphical user interface; (10) to perform any other calculation, computation, program, algorithm, computer function or computer task described or implied above; (11) to receive signals indicative of human input; (12) to output signals for controlling transducers for outputting information in human perceivable format; and (13) to process data, to perform computations, to execute any algorithm or software, and to control the read or write of data to and from memory devices. In some cases, the one or more computers include dimmers for adjusting the intensity or color of light emitted by luminaires. The one or more computers are in any position or positions within or outside of the illumination control system. For example, in some cases (a) at least one computer is housed in or together with other components of the illumination control system, and (b) at least one computer is remote from other components of the illumination control system. The one or more computers are connected to each other or to other components in the illumination control system either: (a) wirelessly, (b) by wired connection, or (c) by a combination of wired and wireless connections.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more a tangible, non-transitory, computer-readable media. For example, in some cases, these instructions comprise instructions for a computer to perform any calculation, computation, program, algorithm, computer function or computer task described or implied above. For example, in some cases, instructions encoded in a tangible, non-transitory, computer-accessible medium comprise instructions for a computer to: (1) to control the operation of, or interface with, hardware components of an illumination system, including any dimmer, light sensor or luminaire, including to control the intensity or color of light emitted by luminaires; (2) to process data from I/O devices indicative of human input regarding values of control variables or human instructions to directly adjust luminaires; (3) to process data from light sensors indicative of intensity of light reflected from certain areas in a room, or of overall intensity of a light source or sources; (4) to computer a mapping, interpolation or regression, or to look up a mapping, interpolation or regression, from a n-dimensional point in a control space $\Omega$ to a m-dimensional point in an illumination space $\Gamma$, where the coordinates of the n-dimensional point represent values of n separate control variables, and the coordinates of the m-dimensional point represent a luminaire multi-setting; (5) to control dimmers to adjust luminaires such that the output of the luminaires is in accordance with a luminaire multi-setting; (6) to process data from I/O devices indicative of human perceptions of lighting effects under different luminaire multi-settings; (7) to perform a dimensionality-reduction algorithm, that takes as an input a high-dimensional data matrix indicative of human perceptions (or sensor readings) of lighting effects under different luminaire multi-settings, and that outputs a lower-dimension approximation of the data matrix; (8) to determine one or more control variables, based on the calculated approximation; (9) to control a graphical user interface; (10) to perform any other calculation, computation, program, algorithm, computer function or computer task described or implied above; (11) to receive signals indicative of human input; (12) to output signals for controlling transducers for outputting information in human perceivable format; and (13) to process data, to perform computations, to execute any algorithm or software, and to control the read or write of data to and from memory devices.

Network Communication

In illustrative implementations of this invention, one or more computers, dimmers, and light sensors comprise nodes in a network. Each of these nodes is configured for communication via a wired or wireless connection with one or more other nodes in the network.

For example, in some cases, the network includes one or more of the following hardware components for network communication: a computer bus, a computer port, network connection, network interface device, host adapter, wireless module, wireless card, signal processor, modem, router, computer port, cables or wiring.

In some cases, one or more computers are programmed by one or more computer programs for communication over a network. For example, in some cases, one or more computers are programmed for network communication: (a) in accordance with the Internet Protocol Suite, or (b) in accordance with any other industry standard for communication, including any USB standard, ethernet standard, wireless standard, or IEEE communication standard.

I/O Devices

In illustrative implementations, an illumination control system includes, or interfaces with, I/O devices. For example, in some cases, some of the I/O devices are located onboard a mobile computing device (e.g., laptop or smartphone).

For example, in some cases, the I/O devices comprise one or more of the following: graphical user interfaces, touch screens, cameras, microphones, accelerometers, gyroscopes, magnetometers, inertial measurement units, pressure sensors, touch sensors, capacitive sensors, buttons, dials or sliders.

In illustrative implementations, a human inputs data or instructions via one or more I/O devices.

DEFINITIONS

The terms "a" and "an", when modifying a noun, do not imply that only one of the noun exists.

The "basis" of the rows of a matrix means a set of one or more vectors, such that each of the row vectors in the matrix is a linear combination of one or more vectors in the set. Similarly, the "basis" of the columns of a matrix means a set of one or more vectors, such that each of the column vectors in the matrix is a linear combination of one or more vectors in the set.

As used herein, "color" includes actual or perceived color as measured in any color model or color space, including color temperature, correlated color temperature, HSI (hue, saturation, intensity) model, RBG (red, blue, green) model, chromacity, or C.I.E. chromacity.

As used herein, "common space" means a group stimulus space, group space or common space calculated pursuant to a dimension-weighted MDS algorithm, such as an INDSCAL algorithm.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. For example, in some cases, a "computer" comprises: (a) a central processing unit, (b) an ALU (arithmetic/logic unit), (c) a memory unit, and (d) a control unit that controls actions of other components of the computer so that encoded steps of a program are executed in a sequence. For example, in some cases, the term "computer" also includes peripheral units, including an auxiliary memory storage device (e.g., a disk drive or flash memory). However, a human is not a "computer", as that term is used herein.

"Defined Term" means a term or phrase that is set forth in quotation marks in this Definitions section.

An "n-dimensional point" means a point in a mathematical space, which point has n coordinates in n dimensions, one coordinate per dimension. This definition applies, regardless of which variable name (e.g., m, n or h) is used.

A "dimension-weighted MDS algorithm" means an algorithm that calculates a common space and that weights one or more dimensions of the common space to describe an individual. Examples of "dimension-weighted MDS algorithm" include INDSCAL, PINDIS or Three-Way Stress algorithms.

"Dimmer" means a device used to control the intensity or color of light emitted by a luminaire of any type (including by an incandescent, compact fluorescent, LED, fluorescent, mercury vapor, or solid state luminaire.)

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

The term "for instance" means for example.

To say that a first variable is a "function" of a second variable means that the value of the first variable depends, at least in part, on the value of the second variable.

As used herein, the term "graphical user interface" or "GUI" means a system comprising: (a) an electronic screen for displaying a user interface: (b) one or more I/O devices (e.g., mouse, keyboard, or capacitive touch sensors) for accepting input from humans for interacting with a display on the screen; and (c) a computer for controlling displays on the screen, processing input received by the I/O devices, and controlling the I/O devices.

"Herein" means in this document, including text, specification, claims, abstract, and drawings.

As used herein, to say that two variables are "highly correlated" means that the Pearson product-moment correlation coefficient between the two variables is at least 0.7.

The terms "horizontal" and "vertical" shall be construed broadly. For example, in some cases, the terms "horizontal" and "vertical" refer to two arbitrarily chosen coordinate axes in a Euclidian two dimensional space, regardless of whether the "vertical" axis is aligned with the orientation of the local gravitational field. For example, in some cases, a "vertical" axis is oriented along a local surface normal of a physical object, regardless of the orientation of the local gravitational field.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"INDSCAL" or "INDividual Differences SCALing" means an individual differences scaling version of MDS.

"Intensity" means any measure of or related to intensity, energy or power. For example, the "intensity" of light includes any of the following measures: irradiance, spectral irradiance, radiant energy, radiant flux, spectral power, radiant intensity, spectral intensity, radiance, spectral radiance, radiant exitance, radiant emittance, spectral radiant exitance, spectral radiant emittance, radiosity, radiant exposure or radiant energy density.

"I/O device" means an input/output device. For example, an I/O device includes any device for (a) receiving input from a human, (b) providing output to a human, or (c) both. For example, an I/O device includes a user interface, graphical user interface, keyboard, mouse, touch screen, microphone, handheld controller, display screen, speaker, or projector for projecting a visual display. Also, for example, an I/O device includes any device (e.g., button, dial, knob, slider or haptic transducer) for receiving input from, or providing output to, a human.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

"Lighting effect" of luminaires means an effect (or attribute) of light that is emitted by the luminaires, which effect (or attribute) is perceived by a human or measured by a sensor. For example: (a) in some cases, a "lighting effect" is a function only of light emitted by the luminaires; and (b) in some cases, a "lighting effect" is a function of both light emitted by the luminaires and of reflectance from a scene.

A "lossy compression" of a matrix means an approximation of the matrix, in which a portion of the information contained in the matrix is absent from the approximation and cannot be retrieved from the approximation.

As used herein, (i) a single scalar is not a "matrix", and (ii) one or more entries, all of which are zero (i.e., a so-called null matrix), is not a "matrix".

The term "mobile computing device" or "MCD" includes any of the following electronic devices: a smartphone, cell phone, mobile phone, phonepad, tablet, laptop, notebook, notepad, personal digital assistant, enterprise digital assistant, ultra-mobile PC, or any handheld or wearable computing device.

"MDS" means multidimensional scaling.

To say that a first number is "much less" than a second number means that the second number divided by the first number is greater than or equal to 2.

To "multiply" includes to multiply by an inverse. Thus, to "multiply" includes to divide.

A "multi-setting" means a permutation of values of separate illumination variables, where each illumination variable controls an attribute of illumination produced by one or more luminaires.

The term "or" is inclusive, not exclusive. For example, if A "or" B are true, then A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

A camera is a non-limiting example of a "sensor".

To say that a set of variables are "separate" means that no variable in the set is a function of any other variable in the set. For example, to say that a group of control variables are "separate" means that none of the control variables is a function of any of the other control variables. For example, to say that a group of illumination variables are "separate" means that none of the illumination variables is a function of any of the other setpoints.

As used herein, the term "set" does not include a so-called empty set (i.e., a set with no elements) or a set of only one element. Mentioning a first set and a second set does not, in and of itself, create any implication regarding whether or not the first and second sets overlap (that is, intersect).

"Some" means one or more.

As used herein, a "subset" of a set consists of less than all of the elements of the set.

The term "such as" means for example.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

A matrix may be indicated by a bold capital letter (e.g., D). A vector may be indicated by a bold lower case letter (e.g., $\alpha$). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) different steps, out of the steps in the method, occur a different number of times during the method, (4) any combination of steps in the method is done in parallel or serially; (5) any step or steps in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, or possessive forms, or different declensions, or different tenses. In each case described in this paragraph, Applicant is acting as Applicant's own lexicographer.

Variations:

This invention may be implemented in many different ways. Here are some non-limiting examples. (The following paragraphs in this Variations section are not claims; instead, they are descriptions of implementations of this invention).

In some cases, this invention is implemented as any combination of one or more of the following:

(A) A method for controlling illumination that accepts input (which input is indicative of human feedback and human qualitative assessment of lighting conditions) and uses the input to rank and order lighting scenes.

(B) The method in (A) further comprising accepting input indicative of a user instruction to adjust the intensity of a plurality of luminaires without direct adjustment of individual luminaire illumination levels.

(C) The method in (B) in which the control of a plurality of luminaires includes intensity settings which are derived from input indicative of a user(s)' perception of the space.

(D) The method in (A) in which a plurality of luminaires are simultaneously controlled such the visual appearance and human perception of the space (e.g., brightness, spatial distribution of light, beam angle, color) are altered yet the energy consumption remains fixed.

(E) The method of (A), in which input for the ranking and ordering includes both (i) input indicative of human feedback and human qualitative assessment and (ii) luminance and illuminance data collected by wireless or wired sensors.

(F) The method in (A), in which ranking and ordering are determined by input indicative of human perception of the lighting conditions.

(G) The method in (A) in which data derived from input indicative of human subjective ratings of lighting scenes is recorded and stored for subsequent calculations.

(H) A method which a computer determines an optimal ranking and ordering of lighting scenes using stored perception and evaluation data of lighting scenes, including any subsequently derived first or second moments, or normalized second moments (e.g., mean, covariance, or correlation) in conjunction with data derived from input indicative of human assessment of lighting conditions.

(I) A method in which a computer uses stored input data (regarding human-perception of lighting scenes) or stored data (derived from sensor measurement of lighting scenes), and matrix factorization techniques to subsequently control luminaire intensity levels, including the application of eigenvalues to rank and order, or subsequently control, the previously measured lighting scenes.

(J) The method in (I), in which a computer performs an algorithm that utilizes either the calculation of Pearson product-moment correlation coefficients (e.g., for measurements on continuous-scale) or polychoric coefficients (e.g., for measurements on a discrete ordinal-scale) to determine either a homogeneous or heterogeneous correlation matrix for factorization.

(K) The method of (I), in which the ranking and ordering is representable as a linear combination of the original measured variables using these eigenvalues.

(L) The method of (I), in which (i) the collected data are projected on a new mathematical basis requiring the use of previously computed eigenvalues (e.g., indicative of perception scores), (ii) these data reflect some linear combination of the original measured variables, and (iii) the mathematical basis of these new data are independent (orthogonal).

(M) The method of (I) in which the algorithmic calculations represent a lossy compression scheme of lighting presets as determined by input data (derived from input indicative of human perception) and/or sensor data in some new orthogonal basis.

(N) A method in which the control of a plurality of luminaires utilizes or depends on any matrix factorization (decomposition) of both (a) data derived from input indicative of human subjective responses (e.g., affective or perception-based quantities) and (b) sensor derived data (e.g., luminance or illuminance).

(O) The method of (N) in which either a linear or nonlinear relationship between luminaire illumination levels (i.e., the brightness settings) and any synthetic variable (previously derived from either sensor readings or input indicative of human perception, or both) is estimated or calculated.

(P) The method of (N) in which any luminaire specific control is a dependent variable such that the relation in (N) is determined solely from the independent variables collected and measured during use. Examples of independent variables include original measured quantities and/or synthetic variables derived using eigenvalues.

(Q) The method of (N) in which the two largest eigenvalues determine a Cartesian coordinate in which each (x,y) pair corresponds to a mapping of luminaire control settings (e.g., axes of lighting control).

(R) The method of (Q), in which higher-order (i.e., 3rd order or higher) eigenvalues are used for control settings.

(S) The method in (N) in which the user controls the luminaire multi-settings along the principal axes of control using these orthogonal synthetic variables (principal lighting components).

(T) The method of (A) that uses the method of (I), in which a computer updates calculations based on new measured data.

(U) A modification of the method of (I) in which any stored homogeneous or heterogeneous correlation matrix which is not diagonalizable matrix can still be factored (e.g., singular value decomposition).

(V) A method in which eigenanalysis is determined apriori (i.e., off-site, or via prior experiments), such that the computer algorithm does not use data derived from input indicative of human perception or affective data.

(W) The method of (V) in which input is accepted, which input is indicative of a human's identification of characteristics about a lighting configuration (e.g., basic information about the luminaires).

(X) The method of (V), in which a subsequent update of the apriori model reflects new data obtained by the user during operation.

(Y) Other means of automatically calibrating the axes of control found via these techniques to arbitrary lighting installations.

In one aspect, this invention is a system comprising, in combination: (a) one or more I/O devices for accepting input from a human user, which input is indicative of a value for each control variable in a set of separate control variables; (b) a computer for analyzing the input and outputting control signals to specify a set of separate setpoints; and (c) a set of dimmers for adjusting the intensity or color of a set of luminaires according to the setpoints; wherein the number of separate control variables is much less than the number of separate setpoints. In some cases, the one or more I/O devices include a graphical user interface that is housed in a wall fixture. In some cases, the luminaires (i) are lighting fixtures that are affixed to a wall or ceiling, or that comprise a lamp, and (ii) are not elements in an electronic display screen that comprises a single integral structure. In some cases: (a) axes of the control variables are a function of a data matrix, which matrix includes data indicative of human perceptions of lighting effects under different luminaire multi-settings; and (b) the number of control variables is much less than the rank of the data matrix. Each of the cases described above in this paragraph is an example of the system described in the first sentence of this paragraph, and is also an example of an embodiment of this invention that may be combined with other embodiments of this invention.

In another aspect, this invention is a system comprising, in combination: (a) one or more I/O devices for accepting input from a human user, which input is indicative of a value for each of n separate control variables, n being greater than or equal to 1; and (b) one or more computers for mapping an n-dimensional point, which n-dimensional point represents the values of the n control variables, to a m-dimensional point, m being greater than n, which m-dimensional point represents values for each of m separate illumination variables; and (c) one or more dimmers for controlling luminaires in a room, to adjust setpoints for intensity or color of light emitted by the luminaires, such that the setpoints are a function of the values of the m illumination variables. In some cases, at least two of the luminaires are lighting fixtures, each of which lighting fixtures comprises a lamp or is affixed to a wall or ceiling of a room. In some cases: (a) the one or more I/O devices include a capacitive touch screen or an electronic display screen; and (b) either (i) the one or more I/O devices are configured to record the x,y position of a point on the screen selected by a human user, such that the x, y coordinates of the position represent values of a first control variable and a second control variable, respectively; or (ii) the one or more I/O devices are configured to record the position of a first point and a second point on the screen, which two points on the screen are selected by a human user, such that a coordinate of the first point on the screen indicates a value of a first control variable and a coordinate of the second point on the screen indicates a value of a second control variable. In some cases: (a) the axes of the control variables are principal components of a rank p matrix; (b) p is greater than n, and (c) the rank p matrix includes data that is indicative of human perceptions of lighting effects under different multi-settings of the luminaires. In some cases: (a) the axes of the control variables are axes of a common space of a configuration; and (b) the configuration is a dimension weighted MDS representation of a rank h matrix, h being greater than n, which rank h matrix includes data indicative of human perceptions of similarity of lighting effects under different multi-settings of the luminaires. In some cases, the system includes sensors for measuring lighting effects under different multi-settings of the luminaires. In some cases: (a) axes of the control variables are eigenvectors of a scatter matrix; (b) the scatter matrix includes data that is indicative of human perceptions or sensor readings of lighting effects under different luminaire multi-settings; and (c) the number of control variables is much less than the rank of the scatter matrix. In some cases: (a) the axes of the control variables are principal components of a rank p matrix; (b) p is greater than n, and (c) the rank p matrix includes data that is indicative of sensor measurements of lighting effects under different multi-settings of the luminaires. In some cases: (a) the axes of the control variables are axes of a common space of a configuration; and (b) the configuration is a dimension weighted MDS representation of a rank h matrix, h being greater than n, which rank h matrix includes data indicative of sensor measurements of similarity of lighting effects under different multi-settings of the luminaires. Each of the cases described above in this paragraph is an example of the system described in the first sentence of this paragraph, and is also an example of an embodiment of this invention that may be combined with other embodiments of this invention.

In another aspect, this invention is a method comprising, in combination: (a) one or more I/O devices accepting input from a human user, which input is indicative of a value for each of n separate control variables, n being greater than or equal to 1; (b) one or more computers mapping an n-dimensional point, which n-dimensional point represents the values of the n control variables, to a m-dimensional point, m being greater than n, which m-dimensional point represents values for each of m separate illumination variables; and (c) one or more dimmers controlling luminaires in a room, to adjust setpoints for intensity or color of light emitted by the luminaires, such that the setpoints are a function of the values of the m illumination variables. In some cases: (a) axes of the control variables are eigenvectors of a scatter matrix; (b) the scatter matrix includes data that is indicative of human perceptions or sensor readings of lighting effects under different luminaire multi-settings; and (c) the number of control variables is much less than the rank of the scatter matrix. In some cases: (a) the method further comprises determining axes of the control variables by calculating eigenvalues and eigenvectors of a distance matrix and calculating a scatter matrix according to a cost function; and (b) the number of control variables is much less than the rank of the distance matrix. In some cases: (a) the axes of the control variables are vectors of principal components scores derived by principal component analysis from a rank p matrix; (b) p is greater than n, and (c) the rank p matrix includes data that is indicative of human perceptions of lighting effects under different multi-settings of the luminaires. In some cases: (a) the axes of the control variables are principal axes of a configuration; and (b) the configuration comprises a lossy compression of a rank h matrix, h being greater than n, which rank h matrix includes data indicative of human perceptions of similarity of lighting effects under different multi-settings of the luminaires. In some cases: (a) the axes of the control variables are axes of a common space of a configuration; and (b) the configuration is a dimension weighted MDS representation of a rank h matrix, h being greater than n, which rank h matrix includes data indicative of human perceptions of similarity of lighting effects under different multi-settings of the luminaires. In some cases, the method also comprises an additional step, which additional step comprises an I/O device accepting one or more additional inputs, such that each of the additional inputs, respectively: (a) occurs after the adjusting of the setpoints in accordance with the values of the m control dimensions; (b) is from a human user; and (c) is indicative of an instruction to adjust only one of the setpoints. Each of the cases described above in this paragraph is an example of the method described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and one or more of the abovementioned implementations, embodiments and features.

What is claimed is:

1. A system comprising, in combination:
   (a) one or more I/O devices for accepting input from a human user, which input is indicative of a value for each control variable in a set of separate control variables;
   (b) a computer for analyzing the input and outputting control signals to specify a set of separate setpoints; and
   (c) a set of dimmers for adjusting the intensity or color of a set of luminaires according to the setpoints;
   wherein
   (i) the number of separate control variables is less than the number of separate setpoints,
   (ii) axes of the control variables are a function of a data matrix, which matrix includes data indicative of human perceptions of lighting effects under different luminaire multi-settings, and
   (iii) the number of control variables is less than the rank of the data matrix.

2. A system comprising, in combination:
   (a) one or more I/O devices for accepting input from a human user, which input is indicative of a value for each of n separate control variables, n being greater than or equal to 1; and
   (b) one or more computers for mapping an n-dimensional point, which n-dimensional point represents the values of the n control variables, to a m-dimensional point, m being greater than n, which m-dimensional point represents values for each of m separate illumination variables; and
   (c) one or more dimmers for controlling luminaires in a room, to adjust setpoints for intensity or color of light emitted by the luminaires, such that the setpoints are a function of the values of the m illumination variables.

3. The system of claim 2, wherein at least two of the luminaires are lighting fixtures, each of which lighting fixtures comprises a lamp or is affixed to a wall or ceiling of a room.

4. The system of claim 2, wherein:
   (a) the one or more I/O devices include a capacitive touch screen or an electronic display screen; and
   (b) either
      (i) the one or more I/O devices are configured to record the x,y position of a point on the screen selected by a human user, such that the x, y coordinates of the position represent values of a first control variable and a second control variable, respectively; or (ii) the one or more I/O devices are configured to record the position of a first point and a second point on the screen, which two points on the screen are selected by a human user, such that a coordinate of the first point on the screen indicates a value of a first control variable and a coordinate of the second point on the screen indicates a value of a second control variable.

5. The system of claim 2, wherein:
(a) the axes of the control variables are principal components of a rank p matrix;
(b) p is greater than n, and
(c) the rank p matrix includes data that is indicative of human perceptions of lighting effects under different multi-settings of the luminaires.

6. The system of claim 2, wherein:
(a) the axes of the control variables are axes of a common space of a configuration; and
(b) the configuration is a dimension weighted multidimensional scaling (MDS) representation of a rank h matrix, h being greater than n, which rank h matrix includes data indicative of human perceptions of similarity of lighting effects under different multi-settings of the luminaires.

7. The system of claim 2, wherein the system includes sensors for measuring lighting effects under different multi-settings of the luminaires.

8. The system of claim 2, wherein:
(a) axes of the control variables are eigenvectors of a scatter matrix;
(b) the scatter matrix includes data that is indicative of human perceptions or sensor readings of lighting effects under different luminaire multi-settings; and
(c) the number of control variables is less than the rank of the scatter matrix.

9. The system of claim 2, wherein:
(a) the axes of the control variables are principal components of a rank p matrix;
(b) p is greater than n, and
(c) the rank p matrix includes data that is indicative of sensor measurements of lighting effects under different multi-settings of the luminaires.

10. The system of claim 2, wherein:
(a) the axes of the control variables are axes of a common space of a configuration; and
(b) the configuration is a dimension weighted multidimensional scaling (MDS) representation of a rank h matrix, h being greater than n, which rank h matrix includes data indicative of sensor measurements of similarity of lighting effects under different multi-settings of the luminaires.

11. A method comprising, in combination:
(a) one or more I/O devices accepting input from a human user, which input is indicative of a value for each of n separate control variables, n being greater than or equal to 1;
(b) one or more computers mapping an n-dimensional point, which n-dimensional point represents the values of the n control variables, to a m-dimensional point, m being greater than n, which m-dimensional point represents values for each of m separate illumination variables; and
(c) one or more dimmers controlling luminaires in a room, to adjust setpoints for intensity or color of light emitted by the luminaires, such that the setpoints are a function of the values of the m illumination variables.

12. The method of claim 11, wherein:
(a) axes of the control variables are eigenvectors of a scatter matrix;
(b) the scatter matrix includes data that is indicative of human perceptions or sensor readings of lighting effects under different luminaire multi-settings; and
(c) the number of control variables is less than the rank of the scatter matrix.

13. The method of claim 11, wherein:
(a) the method further comprises determining axes of the control variables by calculating eigenvalues and eigenvectors of a distance matrix and calculating a scatter matrix according to a cost function; and
(b) the number of control variables is less than the rank of the distance matrix.

14. The method of claim 11, wherein:
(a) the axes of the control variables are vectors of principal components scores derived by principal component analysis from a rank p matrix;
(b) p is greater than n, and
(c) the rank p matrix includes data that is indicative of human perceptions of lighting effects under different multi-settings of the luminaires.

15. The method of claim 11, wherein:
(a) the axes of the control variables are principal axes of a configuration; and
(b) the configuration comprises a lossy compression of a rank h matrix, h being greater than n, which rank h matrix includes data indicative of human perceptions of similarity of lighting effects under different multi-settings of the luminaires.

16. The method of claim 11, wherein:
(a) the axes of the control variables are axes of a common space of a configuration; and
(b) the configuration is a dimension weighted multidimensional scaling (MDS) representation of a rank h matrix, h being greater than n, which rank h matrix includes data indicative of human perceptions of similarity of lighting effects under different multi-settings of the luminaires.

17. The method of claim 11, wherein the method also comprises an additional step, which additional step comprises an I/O device accepting one or more additional inputs, such that each of the additional inputs, respectively:
(a) occurs after the adjusting of the setpoints in accordance with the values of the m control dimensions;
(b) is from a human user; and
(c) is indicative of an instruction to adjust only one of the setpoints.

* * * * *